(12) United States Patent
Churchill et al.

(10) Patent No.: US 7,089,278 B1
(45) Date of Patent: Aug. 8, 2006

(54) ANCHORED CONVERSATIONS: ADHESIVE, IN-CONTEXT, VIRTUAL DISCUSSION FORUMS

(75) Inventors: Elizabeth F. Churchill, San Francisco, CA (US); Lester D. Nelson, Santa Clara, CA (US); Sara Bly, North Plains, OR (US); Catherine C. Marshall, San Francisco, CA (US); Jonathan Trevor, Lancaster (GB); Joseph Sullivan, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/391,069

(22) Filed: Sep. 7, 1999

(51) Int. Cl.
*G06F 15/16* (2006.01)

(52) U.S. Cl. ............... 709/203; 709/205; 709/217; 709/223

(58) Field of Classification Search ........ 709/200–203, 709/204, 205, 206, 217–220, 223, 246, 227–229; 707/9–10
See application file for complete search history.

(56) References Cited

U.S. PATENT DOCUMENTS

| | | | | |
|---|---|---|---|---|
| 5,392,400 | A * | 2/1995 | Berkowitz et al. | 709/203 |
| 5,623,655 | A * | 4/1997 | Chisaka | 707/8 |
| 6,047,314 | A * | 4/2000 | Pommier et al. | 709/205 |
| 6,076,100 | A * | 6/2000 | Cottrille et al. | 709/203 |
| 6,144,991 | A * | 11/2000 | England | 709/205 |
| 6,173,315 | B1 * | 1/2001 | Deleeuw | 709/205 |
| 6,192,394 | B1 * | 2/2001 | Gutfreund et al. | 709/204 |
| 6,230,171 | B1 * | 5/2001 | Pacifici et al. | 707/512 |
| 6,240,414 | B1 * | 5/2001 | Beizer et al. | 707/8 |
| 6,329,984 | B1 * | 12/2001 | Boss et al. | 345/329 |
| 6,411,988 | B1 * | 6/2002 | Tafoya et al. | 709/204 |
| 6,430,625 | B1 * | 8/2002 | Kley et al. | 709/246 |
| 6,496,870 | B1 * | 12/2002 | Faustini | 709/316 |
| 6,542,165 | B1 * | 4/2003 | Ohkado | 345/751 |

OTHER PUBLICATIONS

Anonymous, "CMIFed-An AHM-Based Authoring Environment," *Communications of the ACM*, 37(1994):57.

AOL Instant Messenger, www.aol.com/aim/, date unknown.

Bentley, R., Appelt, W., Busbach, U., Hinrichs, E., Kerr, D, Sikkel, K., Trevor, J. and Woetzel, G, "Basic Support for Cooperative Work on the World Wide Web," in *International Journal of Human Computer Studies: Special Issue on Novel Applications of the WWW*, Spring 1997, Academic Press, Cambridge.

(Continued)

*Primary Examiner*—Bharat Barot
(74) *Attorney, Agent, or Firm*—Fliesler Meyer LLP

(57) ABSTRACT

Anchored conversations are maintained by a conversation coordinator that retrieves an anchor position from an artifact and maintains a position of a conversation client relative to the retrieved anchor position. The conversations are synchronous and asynchronous communications. The anchors, and hence the conversations may be moved within the artifact or to other artifacts. The conversation clients include detach and re-attach buttons that allow a conversation to be detached and reattached from/to a corresponding anchor. The conversation coordinator manages conversations anchored in any number of different applications. Each conversation is accessible either by invoking an associated anchor within a corresponding artifact (embodied as an ActiveX control, for example), or via the conversation coordinator. A database is connected to each conversation and is a silent participant maintaining a record of the conversation and any metadata regarding the conversation. The database is available for query by a user and/or the conversation coordinator.

27 Claims, 12 Drawing Sheets

OTHER PUBLICATIONS

CAVE, evlweb.eecs.uic.edu/EVL/VR/, date unknown.

Bently, R., Horstmann, T., Sikkel, K. and Trevor, J., "Supporting Collaborative Information Sharing with the World Wide Web: The BSCW Shared Workspace System," in *Proceedings of the 4th International World Wide Web Conference*, Boston, Massachusetts, Dec. 12-14, 1995, O'Reilley & Associates, pp. 63-74.

Churchill, E.F. and Snowdon, D., "Collaborative Virtual Environments; An Introductory Review of Issues and Systems," *Virtual Reality: Research, Development and Applications*, vol. 3, No. 1, pp. 3-15, 1998.

Churchill, E.F. and Bly, S., "Virtual Environments at Work: Ongoing Use of MUDs in the Workplace," paper presented at, and in *Proceedings OF WACC '99*, Feb. 22-25, 1999 at Cathedral Hill Hotel, San Francisco, California, USA.

Curtis, P., "Mudding: Social Phenomena in Text-Based Virtual Realities," in M. Stefik, *Internet Dreams: Archetypes, Myths and Metaphors*, Cambridge: MIT Press, pp. 265-292, 1996.

Curtis, P. and Nichols, D.A., "MUDs Grow Up: Social Virtual Reality in the Real World," *Third International Conference on Cyberspace*, May 1993.

Curtis, P., Dixon, M., Frederick, R. and Nichols, D., "The Jupiter Audio/Video Architecture: Secure Multimedia in Network Places," in *Proceedings of MultiMedia '95*, San Francisco, 1995, ACM Press, pp. 79-90.

DIVE, www.sics.se/dive/, date unknown.

Docushare, www.xerox.com, date unknown.

Dubrow, D., "NetMeeting and Flatland," demonstration at CSCW'98, Nov. 14-18, 1998, Seattle, USA.

eRooms, Instinctive Technologies eRooms product; 1998; http://www.emdash.com/eRoom/.

eRooms, www.instinctive.com, date unknown.

Evard, R., "Collaborative Networked Communication: MUDs as System Tools," in *Proceedings of the Seventh Administration Conference (LISA VII)*, Monterey CA, Nov. 1993, 1-8.

Finn, K.E., Sellen, A.J. and Wilbur, S.B. (Eds) *Video Mediated Communication*, Computers, Cognition and Work Series; New Jersey, USA: Lawrence Erlbaum Associates, 1997.

Fleming, D. Design Talk: Constructing the Object in Studio Conversations, in *Design Issues*, vol. 14. No. 2, Summer, 1998.

Gronbaek, Kay, Jens A. Hem, Ole L. Madsen and Lennert Sloth, "Cooperative Hypermedia Systems: A Dexter Based Architecture," *Communications of the ACM*, 37(1994):6564-74.

Gronbaek, Kaj, and Randall H. Trigg, "Design Issues for a Dexter-Based Hypermedia System," *Communications of the ACM*, 37(1994):40-47.

Gutwin, C., "Focus and Awareness Groupware," *Video Demonstration at CSCW '98*, Nov. 14-18, 1998, Seattle, USA.

Halasz, Frank and Mayer Schwartz, "The Dexter Hypertext Reference Model," *Communications of the ACM* 37(1994)30-39.

Hardman, Linda, Dick C.A. Bulterman and Guido van Rossum, "The Amsterdam Hypermedia Model: Adding Time and Context to the Dexter Model," *Communications of the ACM*, 37(1994):50-62.

Huxor, A., "An Active World's Interface to BSCW to Enhance Chance Encounters," in D. Snowdon and E.F. Churchill (Eds) *Proceedings of CVE '98*, Manchester, UK, Jun. 1998.

ICQ, www.mirabilis.com/, date unknown.

Isaacs, E.A., Tang, J.C. and Morris, T, "Piazza: A Desktop Environment Supporting Impromptu and Planned Interactions," in *Computer Supported Cooperative Work '96*, Cambridge, MA, 315-324.

Kozma, R.B., "Virtual Places: A Heterogenous Network Environment for Individual and Collaborative Work," in *Proceedings of CSCW '98*, Nov. 14-18, 1998, Seattle, USA.

Kurlander, D., Skelly, T. and Salesin, D., "Comic Chat," in *Proceedings of SigGraph '96*, pp. 225-236, 1996.

Leland, M.D.P., Fish, R.S. and Kraut, R.E., "Collaborative Document Production Using Quilt," in *Proceedings of CSCW '88*, Portland, Oregon, USA, Sep. 26-28, 1988.

Lotus Domino, www.software.ibm.com, date unknown.

May, R., Bricker, L., Schur, A. and Schwartz, P., "Dynamic Virtual Playground," *Demonstration at CSCW '98*, Nov. 14-18, 1998, Seattle, USA.

MASSIVE, www.crg.computer-science.nottingham.ac.uk/research/systems/MASSIVE, date unknown.

MASSIVE-2, www.crg.computer-science.nottingham.ac.uk/research/systems/MASSIVE-2/, date unknown.

O'Day, V., Bobrow, D., Bobrow, K., Shirley, M., Hughes B. and Walters, J., "Moving Practice: From Classrooms to MOO rooms," *Computer Supported Cooperative Work: Special Issue on Interaction and Collaboration in MUDs*, vol. 7, Nos. 1-2, pp. 9-45, 1998.

Palace, www.thepalace.com, date unknown.

Rivlin, Ehud, Rodrigo Botafogo and Ben Shneiderman, Navigating In Hyperspace: *Designing A Structure-Based Toolbox*, 37(1994):87-96.

Roseman, M. and Greenberg, S., "TeamRooms: Network Places for Collaboration," in *Proceedings of CSCW '96*, Cambridge, MA, USA. ACM Publications.

Roseman, M., "TeamWave Workplace," Demonstration at *CSCW '98*, Nov. 14-18, 1998, Seattle, USA.

Stahl, G., Herrmann, T. and Loser, K., "WebGuideo: Guiding Cooperative Work on the Web with Perspectives and Negotiation Support," Demonstration at *CSCW '98*, Nov. 14-18, 1998, Seattle, USA.

Stefik, M., Bobrow, D.G., Foster, G., Lanning, S. and Tatar, D., "WYSIWIS Revised: Early Experiences with Multiuser Interfaces," *ACM Transactions on Information Systems*, vol. 5, No. 2 (Apr. 1987), pp. 147-167, 1987.

Tang, J.C. and Rua, M., "Montage: Providing Teleproximity for Distributed Groups," in *Proceedings of CHI '94*, Boston, Mass, USA, Apr. 24-28, 1994.

Taylor, R., Mansfield, T. and Fitzpatrick, G., "Crisis in Ragan: Orbit at Work", Video demonstration at *CSCW'98*, Nov. 14-18, 1998, Seattle, USA., 1998.

TeamWave, www.teamwave.com, date unknown.

The Groupkit Home Page, www.cpsc.ucalgary.ca/projects/grouplab/groupkit/, date unknown.

Tolone, W., Kaplan, S. and Fitzpatrick, G., "Specifying Dynamic Support for Collaborative Work within Worlds," in *Proceedings of ACM COOS*, 1995.

Virtual Places, www.sri.com/policy/ctl/html/virtual_places.html, date unknown.

Chang, B.-W., Mackinlay, J.D., Zellweger, P.T. and Igarashi, T., "A Negotiation Architecture for Fluid Documents," *UIST'98 Proceedings of the 11th Annual Symposium of User Interface Software and Technology* (San Francisco, California, Nov. 1-4, 1998), pp. 123-132.

mIRC—An Internet Relay Chat program, http://www.mirc.com, date unknown.

Zellweger, P.T., Chang, B.-W. and Mackinlay, J.D., "Fluid Links for Informed and Incremental Link Transitions," *Proceedings of Hypertext '98*, Pittsburgh, Pennsylvania, Jun. 20-24, 1998, pp. 50-57.

* cited by examiner

ANCHORED CONVERSATIONS: ADHESIVE, IN-CONTEXT, VIRTUAL DISCUSSION FORUMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to communications and information sharing in joint and/or collaborative working environments. The invention is more particularly related to the use of chat box type communications devices anchored in a work artifact or an application. The invention is still further related to an anchored conversation that is detachable, movable between different applications, and capable of stand alone operations. The invention is also related to management of anchored conversations initiated by varied applications, including a database that maintains conversation logs and anchor histories of each conversation.

2. Discussion of the Background

In recent years a number of easy-to-use systems have become available that support synchronous and asynchronous communications between non-collocated individuals. Examples are chat, IRC, instant messenger applications (e.g. AOL Instant Messenger), MUDs, and MOOs (Evard, 1993; Curtis and Nichols, 1993). These systems have proven very popular within the workplace and many groupware platforms now include facilities which support synchronous chat applications (e.g. Lotus Domino (http://www.software.ibm-.com/)).

Such systems support:

Quick and low effort contact despite geographic separation

Non-intrusive initiation of contact with others

The possibility for ongoing and frequent interactions

Communication with multiple people

Possibilities for multiple simultaneous conversations with different individuals/groups in different desktop windows.

An example implementation using IRC has the following characteristics. IRC is a network of chat server programs that support a simple protocol for text-based chat clients. There are add-ons for sound and graphics in the clients triggered by text keywords/commands. IRC clients for many operating systems (Windows, Unix, Mac) are available (e.g., mIRC). Using an IRC client program a user can exchange text messages interactively. When logged into a chat session, a user can "converse" by typing messages that are sent to other chat participants. Each IRC server provides a virtual meeting place. On IRC users meet others on "channels" (rooms, virtual places) to talk in groups, or privately. There is no restriction to the number of people that can participate in a given discussion or the number of channels that can be formed on IRC. All servers are interconnected and pass messages from user to user over the IRC network. One server can be connected to several other servers and up to hundreds of clients.

In the case of some MUDs and MOOs, conversations also have a persistent dimension so they enable the use of logs for catch-up and review. However, a common problem with most tools is that, whilst they support easy communications, they do not support the close integration of work artifacts and communications.

Conversations tend to occur in windows that are separate from, and have no connection or relationship to, the shared artifacts. This is illustrated in FIG. 1. In FIG. 1, a number of open windows, including a MUD chat window 110, can be seen on a computer display 100. Although conversants in the chat window share a communication context, they do not share a view of the work artifact(s) (e.g. Word files) under discussion. Working documents appear in separate windows.

This separation is a problem for certain kinds of collaborations, in particular collaborations that have been characterized as "tightly" coupled. Tightly coupled collaborations often involve problem solving with others through conversations over shared artifacts (e.g. whiteboards, models, documents, etc).

Conversations in tightly coupled collaborations have been characterized as "object laden" (Fleming, 1998); there is a high level of focus on the object or artifact that is under discussion and/or that is being co-constructed. Such conversations, therefore, work well in a shared context, i.e. that collaborators all have visual access to the artifact or object under construction or discussion. In Fleming's terms, the "object leads and language follows". At the other end of the continuum, loosely coupled collaborations often involve elaborative conversations. Elaborative conversations are relatively independent of the material world and include instances of narration, argument and application. Here the "language leads and the object follows", and the objects in such discourse tend to be fairly stable entities.

Evidence from interviews with collaborators who use chat applications and text-based virtual environments suggest that elaborative conversations are easy to achieve, but that "object laden" conversations are not. The latter require users to paste text into the shared chat window or to find some other means for sharing the specific content over which they wish to converse (Churchill and Bly, 1999).

Such pasting has the side-effect of taking the pasted-in material out of its context. For example, a paragraph taken from a document and pasted into a chat space no longer can be discussed in the context of the rest of the document. Reference to the rest of the document is then in the absence of the shared document.

Another option is to re-represent the entire artifact in the virtual environment and place both the artifact and users (in the form of avatars) into the virtual world. This is the approach taken in 2D graphical MUDs like the Palace (http://www.thepalace.com) and in 3D virtual environments like the MASSIVE environment where people and artifacts are represented as avatars and shared objects.

For example, in FIG. 2, a 3D graphical world is illustrated that contains a shared blackboard 200 and conversants that have been re-represented digitally as "block" avatars (210). Within simple 2D graphical virtual environments (e.g. the Palace), background images provide shared context. Task related backgrounds are created before virtual meetings can take place. The setting up of the conversation space and rendering of necessary objects in that space is costly time-wise, and represents a barrier to quick and easy contact, communications and collaborations.

SUMMARY OF THE INVENTION

The present inventors have realized the utility of anchoring conversations, such as chat spaces and other communication clients, to applications and points in artifacts of applications (typically enhancing communications in a collaborative development environment). Accordingly, it is an object of this invention to anchor a communication client to any location within an artifact of a number of different applications so that communications may be initiated and maintained with reference to the artifact as a backdrop for the communication.

It is another object of the present invention to allow flexible placement of a user interface of the communications client, either anchored in reference to the reference artifact, detached and moved to another place in the artifact, attached to a second artifact, attached to a second or more applications, or detached from any applications or artifacts.

It is yet another object of the present invention to allow communication requests, initiated at a communication client to invoke a communication client at a remote user location along with the application and artifact to which the conversation client is anchored.

It is yet another object of the present invention to maintain a database of conversations in relation to an anchor that references a location where the conversation is to be located. The database would include a history of the conversations and a history of where the conversation has been anchored.

The present invention is a system for placing and maintaining anchored conversations, that includes a conversation coordinator configured to anchor a conversation client to one of an application and an artifact of said application. The conversation client itself is embodied in any communications mechanism.

The present invention is also embodied in a system for invoking anchored conversations having artifacts of applications as a context, including an application conversation interface (ACI) having an application access mechanism that allows access and manipulation of application operations of each of the said applications, and an anchor mechanism configured to identify and attach a conversation client to a selected anchor position in an artifact.

The present invention is also embodied in a method of initiating and coordinating anchored conversations, comprising the steps of receiving a conversation request from a conversation client anchored in a master artifact, and initiating an anchored conversation with the requesting conversation client.

The present invention takes an approach entirely different from the current relationship between artifacts and a environments as seen in the above discussed virtual worlds. Rather than recreating worlds in the shared virtual spaces that are the conversation places, the present invention places conversations within the already existent work contexts. In the sections that follow we outline an application which instantiates this new approach, referred to as Anchored Conversations. Anchored Conversations support lightweight synchronous and asynchronous communications, and provide a shared context for work-related conversations with only minimal set-up on the part of end users.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention enables synchronous and asynchronous communications in conjunction with work artifacts such as documents (e.g. Word files, Powerpoint files, spreadsheet files, graphical simulations, etc.). The present invention is referred to as Anchored Conversations.

Figure 1:
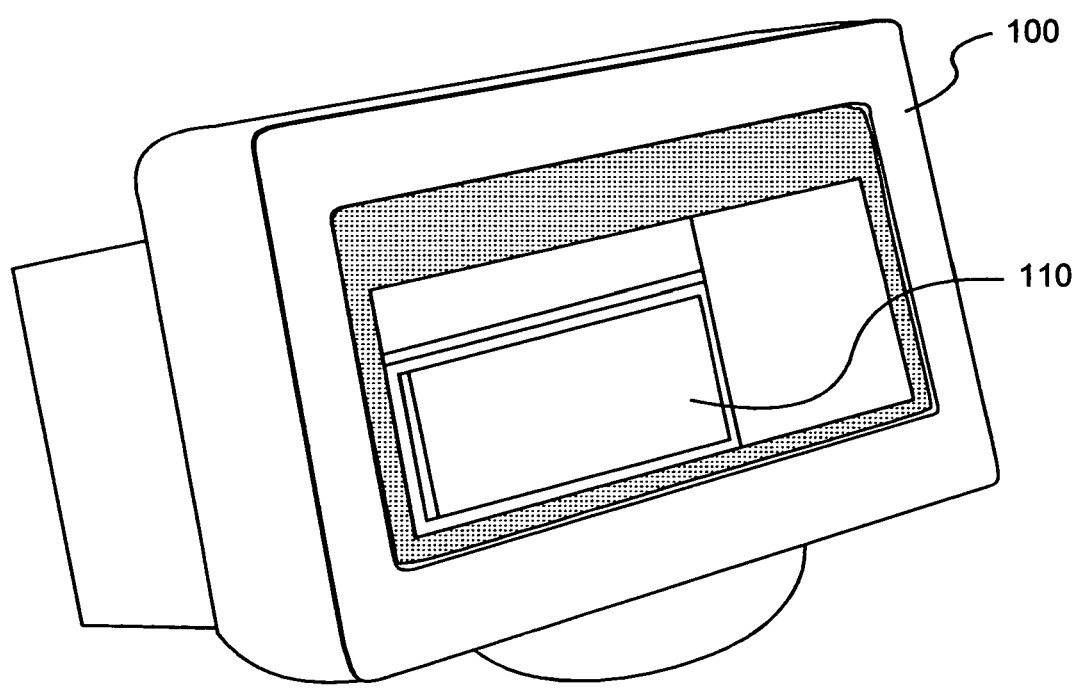
FIG. 1 is an illustration of a computer display having several open applications including a MUD chat window.
Figure 2:
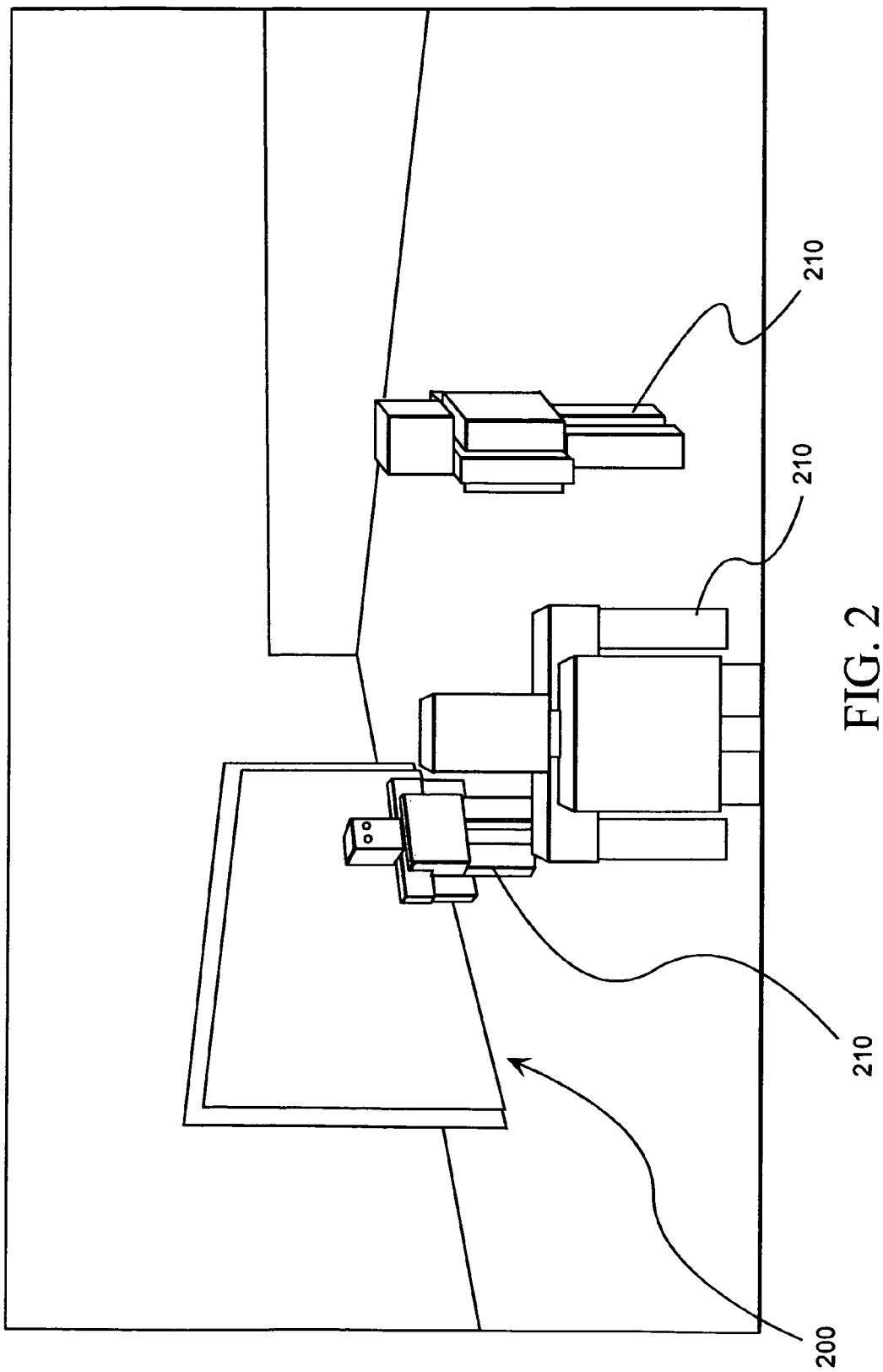
FIG. 2 is an illustration of a MASSIVE-1 3D virtual environment with a shared blackboard and avatars.
Figure 3:
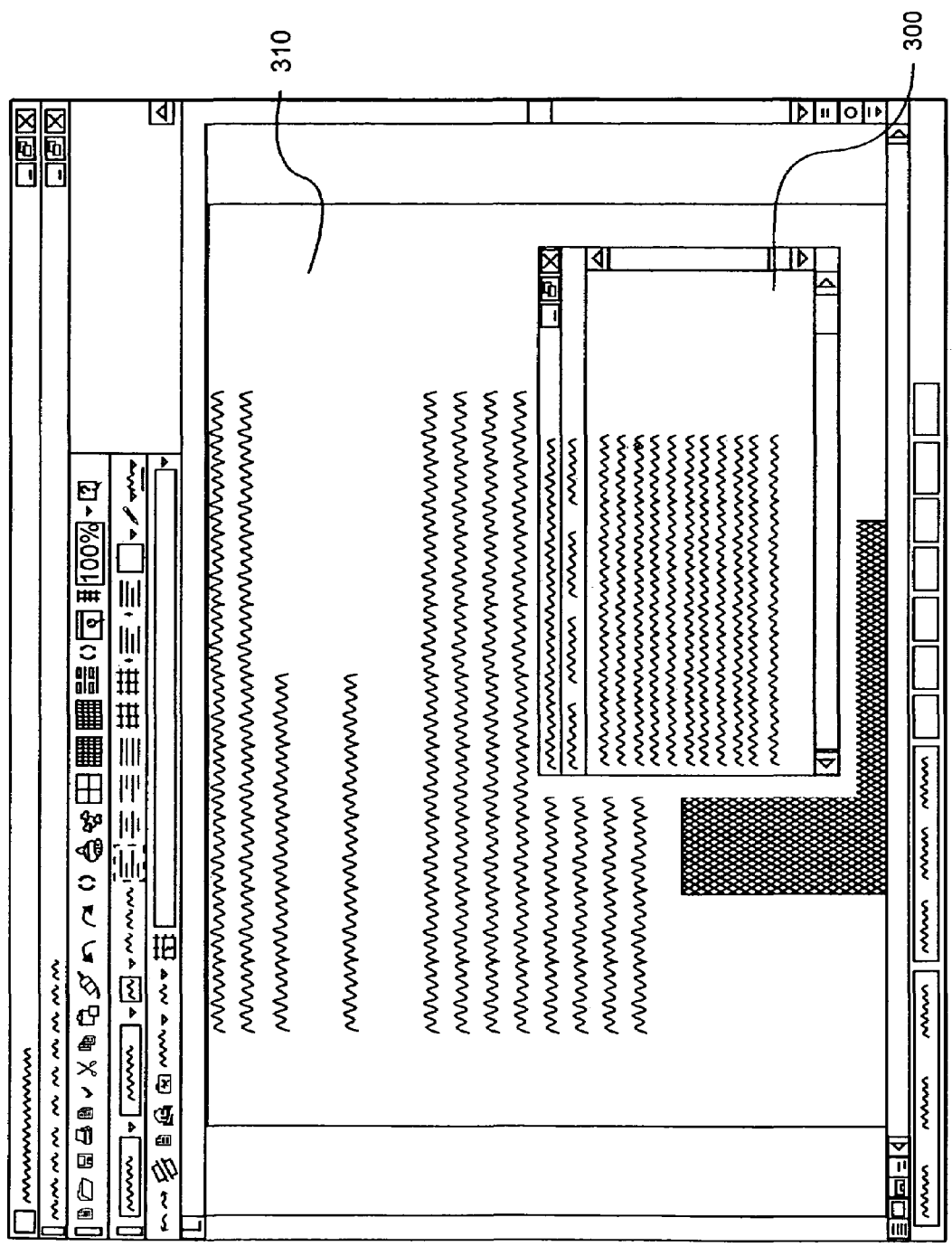
FIG. 3 is an illustration of an anchored conversation according to the present invention.

Referring again to the drawings, wherein like reference numerals designate identical or corresponding parts throughout the several views, and more particularly to FIG. 3 thereof, there is illustrated a mock-up of an Anchored Conversation. A lightweight, text-based virtual forum 300 (anchored conversation, anchored conversation space, or conversation client) is anchored into a word processor document (artifact) 310. In the virtual forum 300, three people (users Cathy, Joe and Elizabeth) are communicating synchronously in the Anchored Conversation space as a conversation using text. Each user is able to see the document (artifact) that is relevant to the conversation. The document (artifact) is viewed from its native application and provides the context for the conversation.

Anchored Conversations create a shared work context in a cognitively and computationally cheap way. This cognitive ease of use manifests itself in a number of ways.

First, by taking the conversations to the work artifacts, Anchored Conversations do not require that conversants and task artifacts be re-represented in a virtual world before a shared context can be established. Instead, Anchored Conversations place conversations within the already existing work contexts. Users do not need to set up the shared context.

Secondly, Anchored Conversations are cheap in terms of usage costs. Because Anchored Conversations are attached (anchored) to existing documents, it is possible to leverage the existing functionality of an application (e.g. different views in Word documents). This means it is possible to build on the user's existing expertise and knowledge of how to use document application. The user is not placed into an unfamiliar context to read the relevant documents, and their model of how to read and navigate through documents remains appropriate. By contrast, tools which re-render work artifacts require that users learn how to interact with those artifacts in new ways.

Thirdly, Anchored Conversations are also low overhead because their use is uniform across different applications. Thus, inserting an Anchored Conversation into a spreadsheet requires the same or highly similar actions as inserting one into a Word document. In addition, holding a discussion in an Anchored Conversation where an image provides the background (e.g. in Adobe PhotoShop) requires the same user actions as holding a discussion in a spreadsheet when a same conversation client is utilized.

Fourthly, users can move between different documents and applications following conversation links (a hyperlink to a part of another artifact, for example). Following conversation links in this way results in the background documents being opened automatically, and circumvents the need for the user to search for the relevant documents to open. A Conversation Coordinator/Manager handles the navigation to locations in documents in different applications and not the user.

Anchored Conversations are not simply embedded chat objects. Conversations are affixed to documents via "anchors" in the document which store information about the local context for the conversation. For example, this context may be words which are nearest to the anchor, or unique cell identifier or identifiers in a spreadsheet. Such information regarding the location into which an Anchored Conversation is currently inserted is retained in a database, along with information about its creation time and date, and any previous points at which it has been anchored.

This information is stored in a database of all Anchored Conversations, wherein all conversations are also stored. Users may query this database to see, for example, if an Anchored Conversation has ever been located in a different place or other queries (find portions of a conversation, and search for keywords, for example). Actions (moving an anchor, for example) and conversations that take place within an Anchored Conversation window are retained in the database, and are available for search, review and reuse.

Anchored conversations combine the positive benefits of lightweight communication tool, the requirements for supporting the 'object laden' conversations discussed above, and the requirements for asynchronous, attached notes. In a preferred embodiment, they have the following features:

Support for both synchronous and asynchronous communications between colleagues who are geographically separated;

The ability to create user-determined 'locales' or forums for having conversations. Users can create Anchored Conversations to accommodate their communication needs;

The ability to establish shared context to support 'object laden' conversations. All participants have the ability to see the same section of a document which is under discussion;

The ability to create Anchored Conversations to accommodate a user's communication context needs;

Because Anchored Conversations are literally anchored to relevant places in documents, users are "taken" to the relevant location automatically and need not search for the relevant context to share and discuss;

Easy use and minimal set-up time. There is no need to represent work artifacts in the shared virtual forum because the virtual forum is placed into the workspace. Note that the granularity (level of detail shown, i.e., the contents of the file, words or pictures for example) differs from shared workspace models which operate at the level of shared folders and files (e.g. TeamWave Workplace, Roseman, 1998). Using Anchored Conversations, the work texts themselves are shared;

Support for multiple Anchored Conversations in multiple locations within one document or even in different documents. Users can therefore engage simultaneously in multiple conversations with different individuals or groups;

The ability to move conversations to contexts which may become relevant;

(While Anchored Conversations can be placed into document contexts, they can also be temporarily "unhooked" and moved. In this case they behave like other chat space applications, in that the conversation window is separate from its "home" document or a location within that document. On being closed by the user, the Anchored Conversation returns to its original location. This is achieved this because the anchor location is stored and is always available for use. Anchored Conversations can also be permanently "de-anchored", and reattached to a new location or left "anchor-less" in which case it is only accessible through an outside mechanism such as the Conversation Coordinator/Manager.)

A mechanism to log and review conversations. These logs include metadata or information associated with an artifact and relative to maintaining a conversation, which may include information that can provide a history of the production and use of the document;

A mechanism to leave notes for others. These represent asynchronous, collaborative annotations over a document; and Provision of awareness of the activities of others to provide a context for a user's own activities—this contributes to the management of collaborative work activities.

Figure 4B:
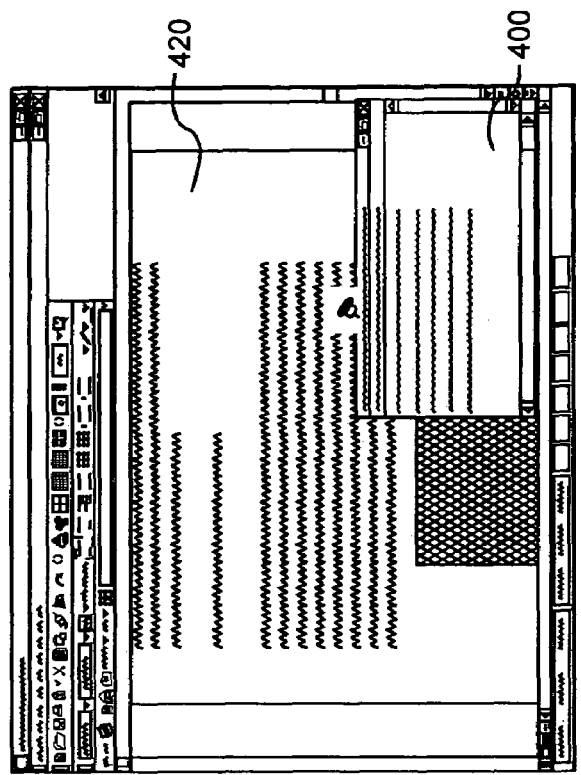
FIG. 4B is an illustration of an active anchored conversation.
Figure 4A:
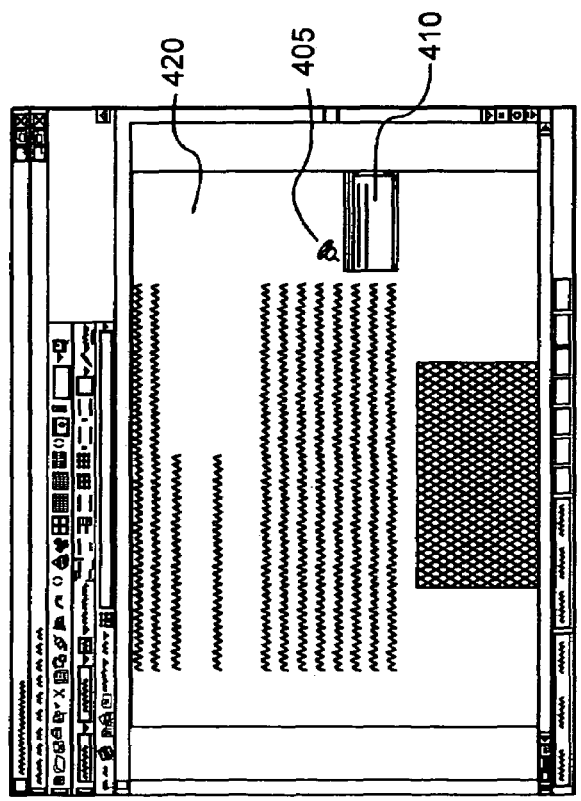
FIG. 4A is an illustration of an inactive anchored conversation.

FIG. 4A shows an inactive Anchored Conversation (thumbnail) 410 shown as a thumbnail within the margin of a text document 420 indicating that an Anchored Conversation has been inserted. A thumbnail or any other representation may be utilized to indicate an inactive conversation, and also represents a location of an anchor to which a conversation is attached. The thumbnail (and anchor) is inserted at the place in the document about which the creator wishes to have a discussion.

By clicking on the thumbnail, the user opens the conversation window, and can join the virtual conversation which may be in progress between other colleagues. FIG. 4B shows an active Anchored Conversation 400, anchored to a position relative to an anchor (shown at thumbtack 405) associated with the inactive conversation (and now the active conversation). Although the thumbtack 405 is seen in a different position in FIG. 4B as compared to FIG. 4A, the anchor position is not changed by initiating the conversation client. The active Anchored Conversation is a chat client or other communications application.

Figure 8:
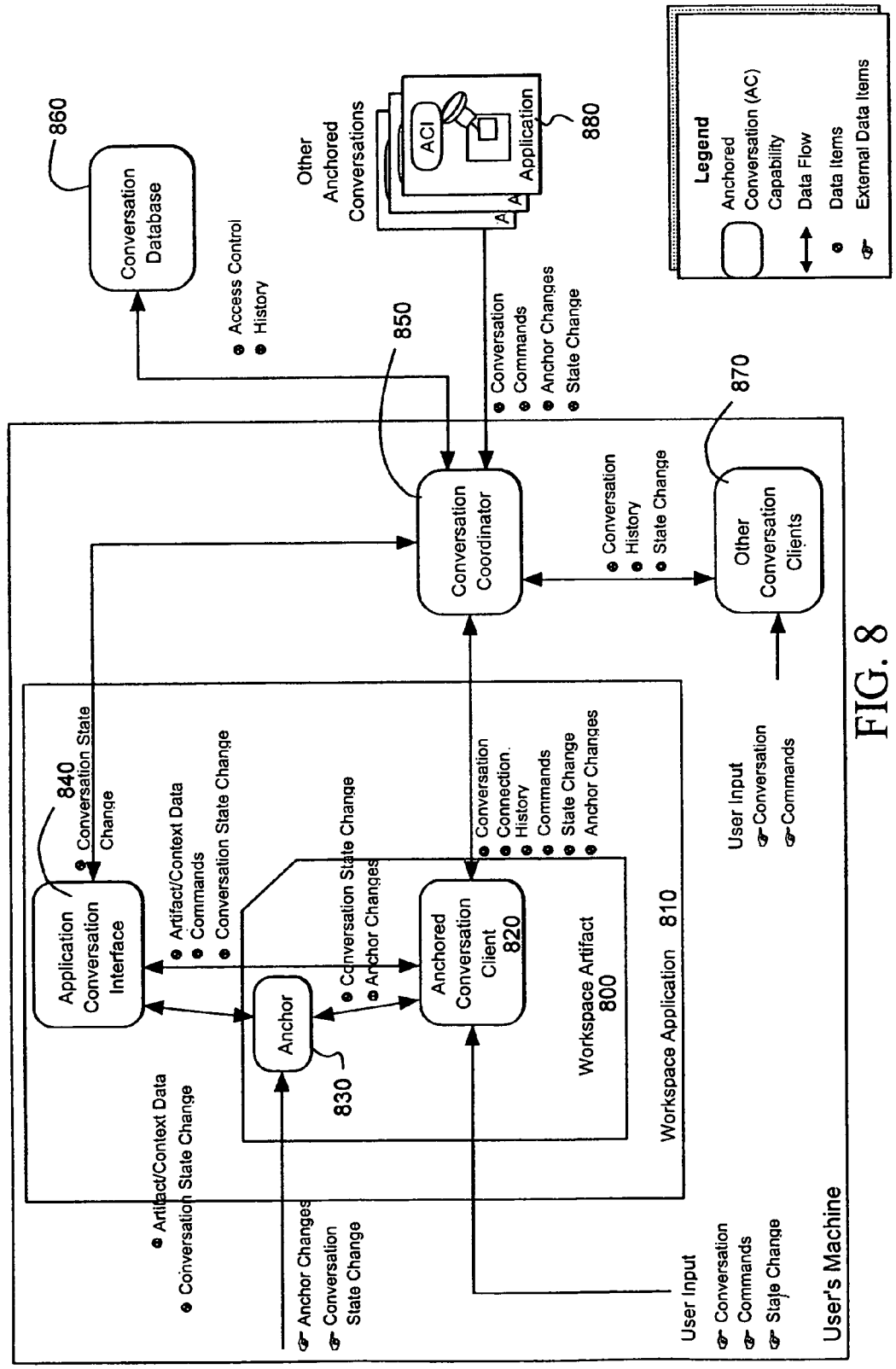
FIG. 8 is a block diagram of major components for implementing one embodiment of the present invention.

All conversations are logged and are therefore persistent (See database 860, FIG. 8, for example). Thus, if other colleagues are not currently actively conversing in the window or are not available for synchronous discussion, the user is still able to review any discussion which was carried out previously in that virtual discussion forum.

Figure 4C:
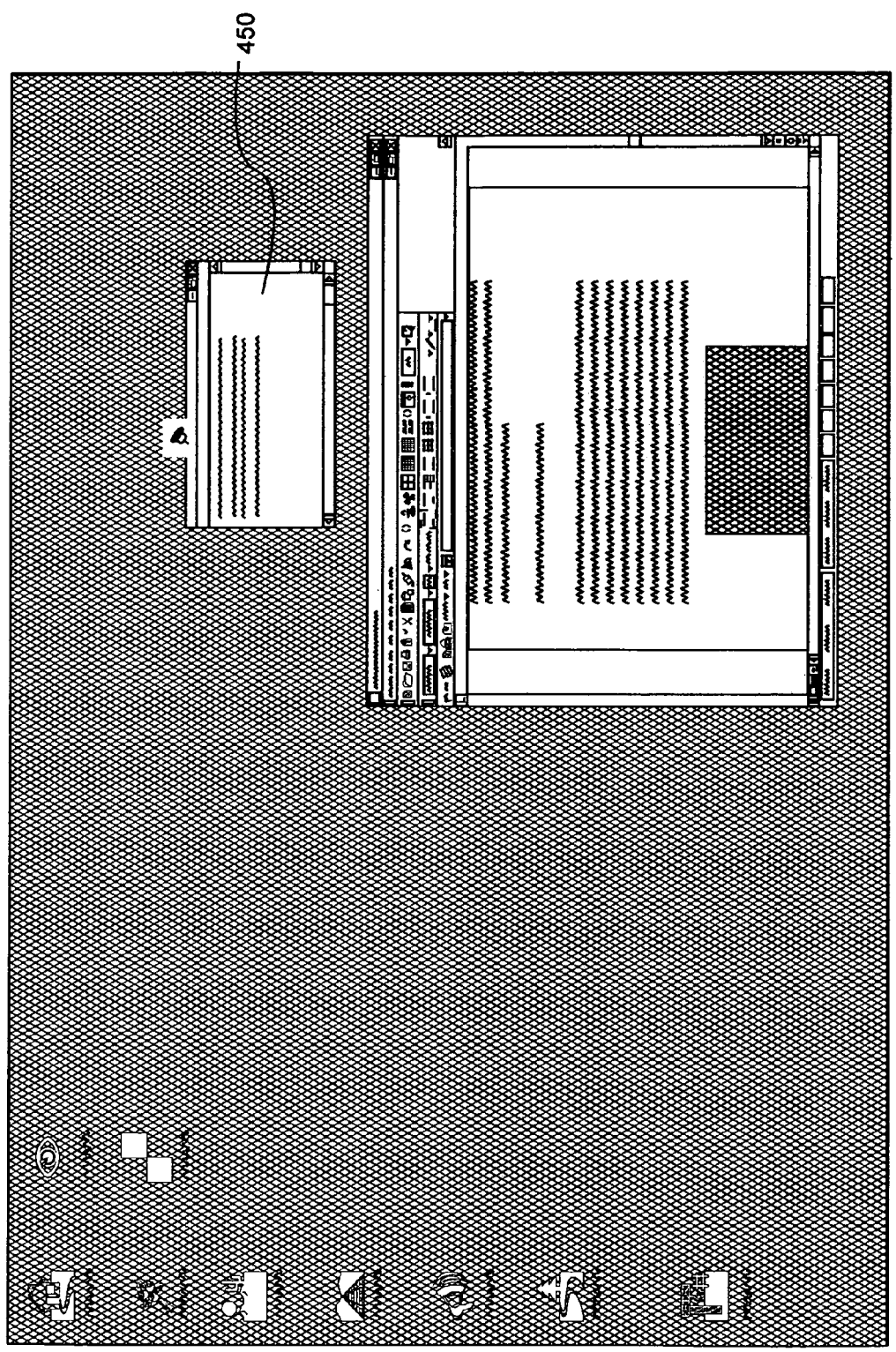
FIG. 4C is an illustration of an anchored conversation detached from an associated application and artifact.

FIG. 4C illustrates a detached anchored conversation 450. As before, there are three people in the virtual discussion forum, all of whom have access to the same view of the paragraph that is under discussion, as the Anchored Conversation is set in the portion of the document under discussion. The Anchored Conversation window can be moved to the side of the text if required, as shown in FIG. 4C, but always will return to the anchor point when the document or the conversation space is closed. In one embodiment, if the conversation is detached, and document is closed, the conversation (conversation client) remains active and available for further communications. Alternatively, the closing of the document may be a signal to shut down the conversation client.

Figure 5A:
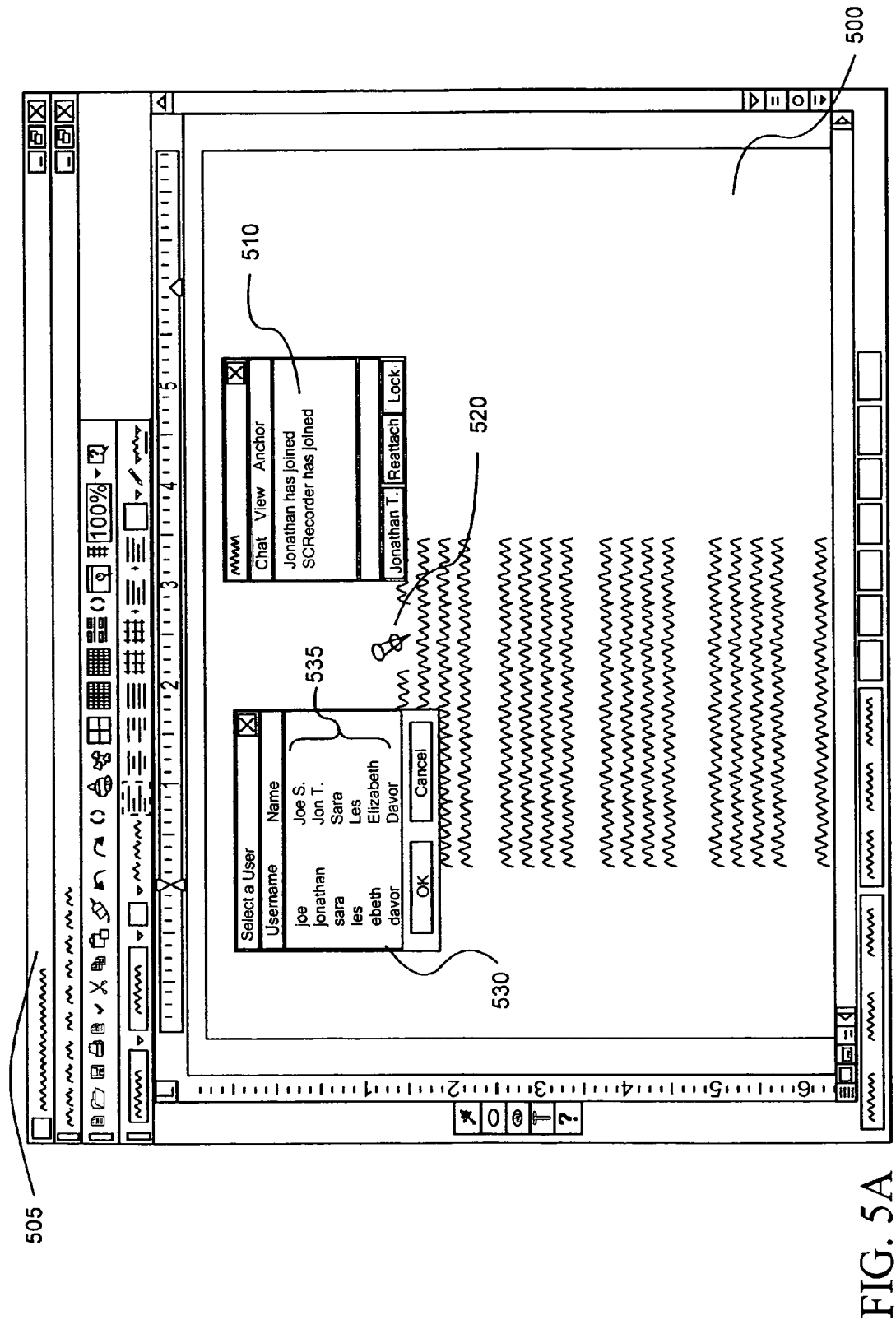
FIG. 5A is an illustration of an insertion of an anchored conversation.
Figure 5B:
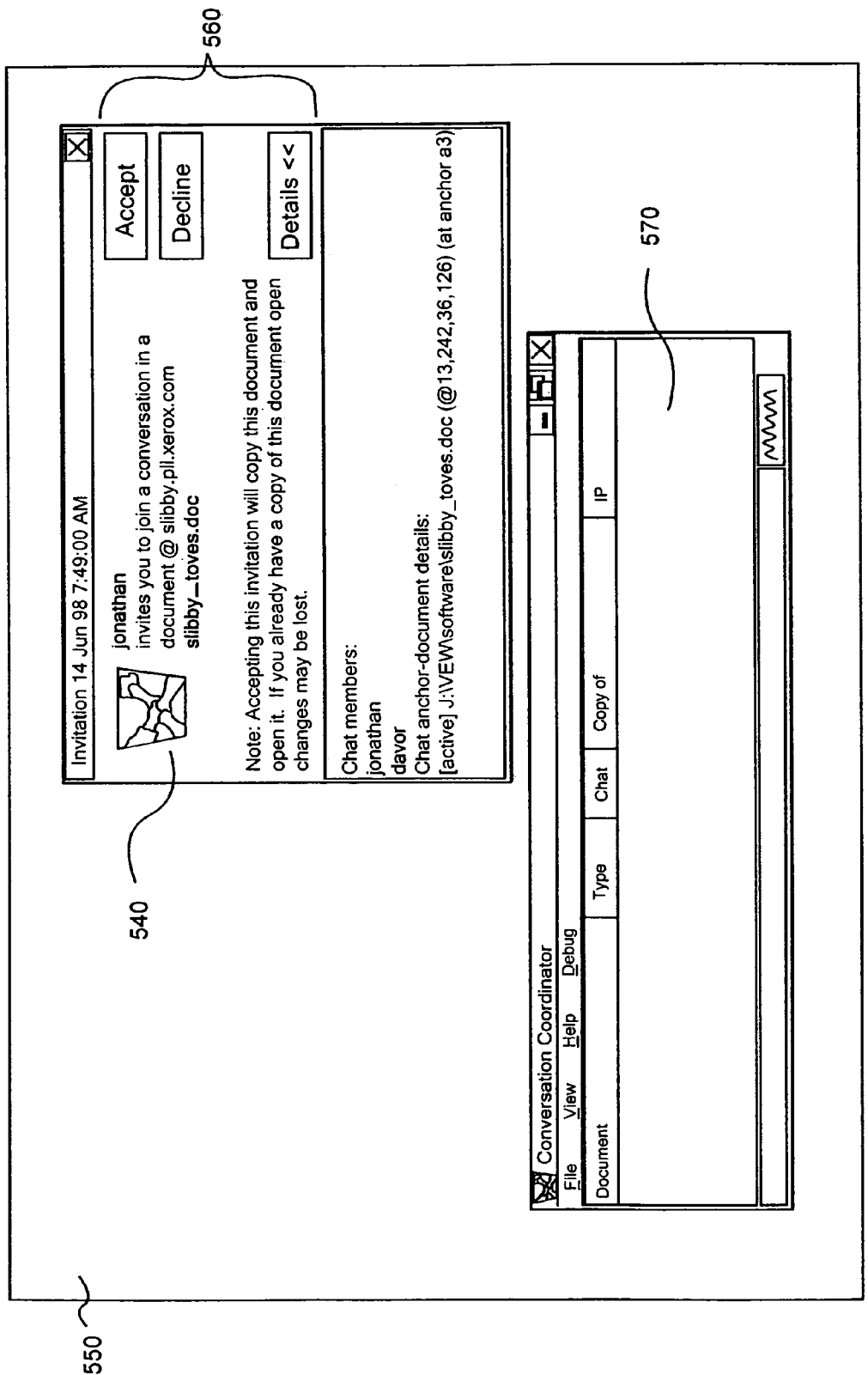
FIG. 5B is an illustration of an invitation associated with an anchored conversation insertion.
Figure 5C:
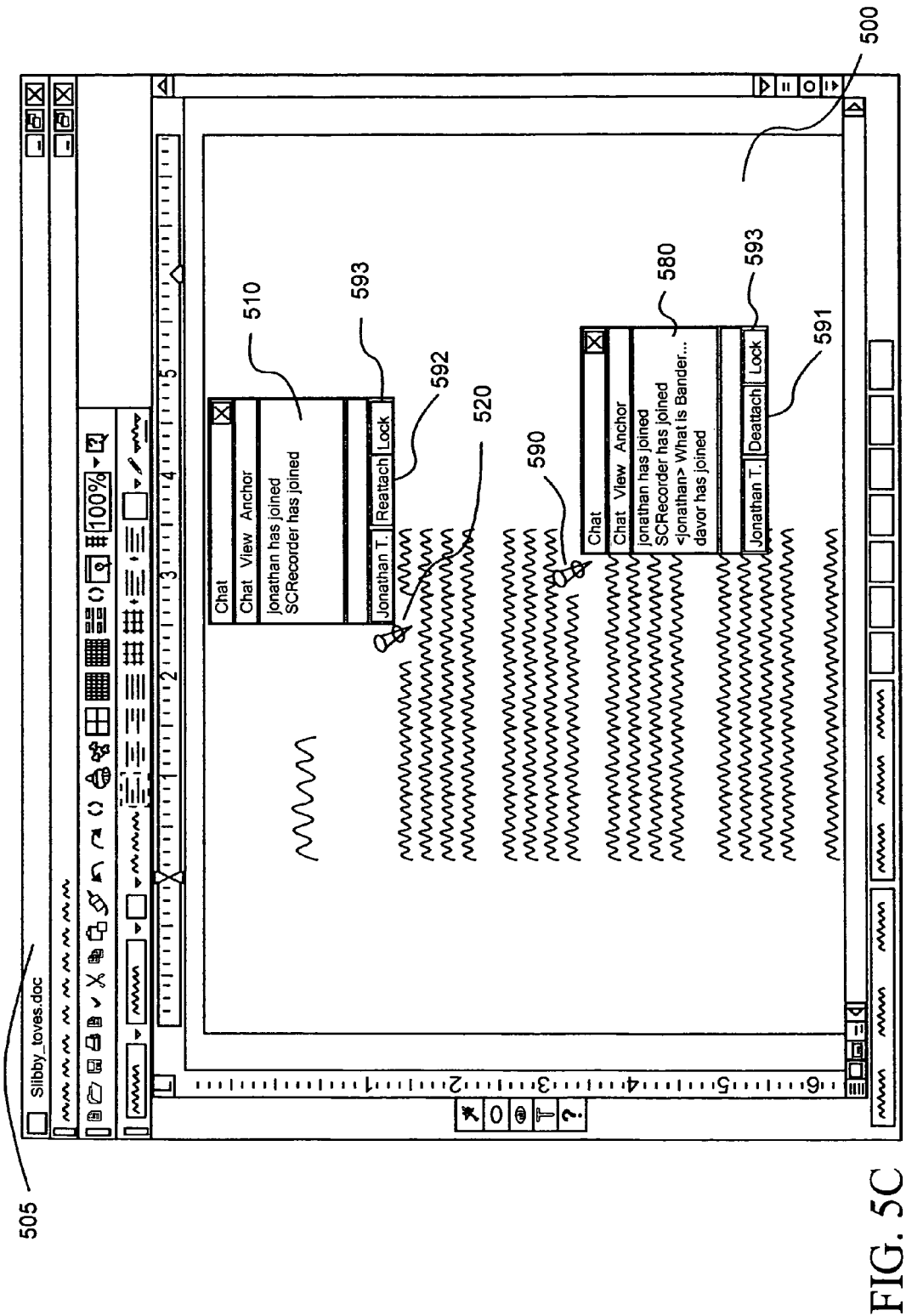
FIG. 5C is an illustration of an inserted anchored conversation.

FIGS. 5A–5C illustrate the insertion of an anchored conversation into a slithey_toves document 500 of an application 505 (Microsoft Word is utilized as an example, however, the procedures described may implemented by one skilled in the art to any other word processor or other applications, graphics packages or spreadsheet, for example). In FIG. 5A, document 500 has an active anchored conversation 510 associated with an anchor (illustrated as pushpin) 520. An insert anchor macro (see table A1, Adding an Anchor, for example) has been executed to insert an anchored conversation (at a current cursor position, between the exclamation mark and end quote after Bandersnatch, for example). The macro prompts the user (see pop-up selection box 530, for example) to select a user with which to engage in the anchored conversation. The user selects a user to invite into a conversation, and clicks OK. In one embodiment, the pop-up selection box includes a default listing of the inviting users buddy list (535, for example).

Referring now to FIG. 5B, the invitation request causes an invitation 540 is displayed at a terminal 550 of the invited user. The invitation request provides the invited user with facilities 560 to accept, decline, or view details of the invitation. Other facilities may also be provided, a picture of the invitor, or the invitor's rank, for example). FIG. 5B also illustrates a conversation coordinator user interface 570 (conversation coordinator 850, for example, discussed herein), displaying document information regarding anchored conversations in which the user of terminal 550 is engaged (currently no document information displayed, however, after an acceptance of jonathan's chat invitation, the user interface 570 will display the type, Chats, copy of, and IP of the document which jonathan requested the conversation from).

FIG. 5C illustrates the result of the anchored conversation invitation and davor's acceptance. The active anchored conversation 510 is still present, and an additional conversation 580 is shown with anchor 590 which has jonathan and davor engaged in a conversation regarding Bandersnatch. At davor's terminal 550, an application (Microsoft Word in this example) is automatically initiated and a copy of the slithey-_toves document 500 is automatically retrieved (retrieved via any retrieval mechanism, downloading, file reading/sharing, ftp, or e-mail, to name a few examples) and displayed at the point of the anchored conversation insertion to provide a backdrop for the conversation (not shown, but would appear similarly to document 500 and additional conversation 580 and pushpin 590 at jonathan's terminal).

FIG. 5C also illustrates detachability of the anchored conversation clients. Note that additional conversation 580 is "attached" (anchored) to pushpin 580 at a default locking position (the additional conversation 580 will remain positioned with an upper left hand corner at the pushpin 590 as the document 500 is scrolled, or the application 505 is moved about the screen). Any other anchored position may be utilized, a lower left-hand corner, or 1" to the left, for example. Each conversation client (active anchored conversation 510 and additional conversation 580) includes a button for attaching and/or deattaching the conversation client from its respective anchor. Note the additional conversation 580 has a button 591 which, if pressed, would disassociate or deattach it from the anchor 590 and allow it to be dragged or moved to another position.

Also note that active anchored conversation 510 is not anchored in a position relative to its corresponding anchor 520, but instead is up and to the right. Button 592, if pressed, will re-attach (anchor) conversation client 510 to anchor 520.

Each conversation client also has a Lock button that allows a user of the conversation client to lock the relative anchor position of the client. For example, the active anchored conversation 510 has been deattached and moved from its default locking position. The user may utilize the lock button 593 to redefine the locking position to its current location. In this case, the conversation client 510 would remain in its same relative position to the anchor 520 when the document 500 is scrolled, or the application 505 is moved to a different location.

An additional feature (not shown) is a reset mechanism that may be invoked by any known mechanism (pull down menu or button, for example). The reset mechanism resets each anchor to a default setting, such as the default anchor setting described above with respect to the additional anchored conversation 580.

Figure 6:
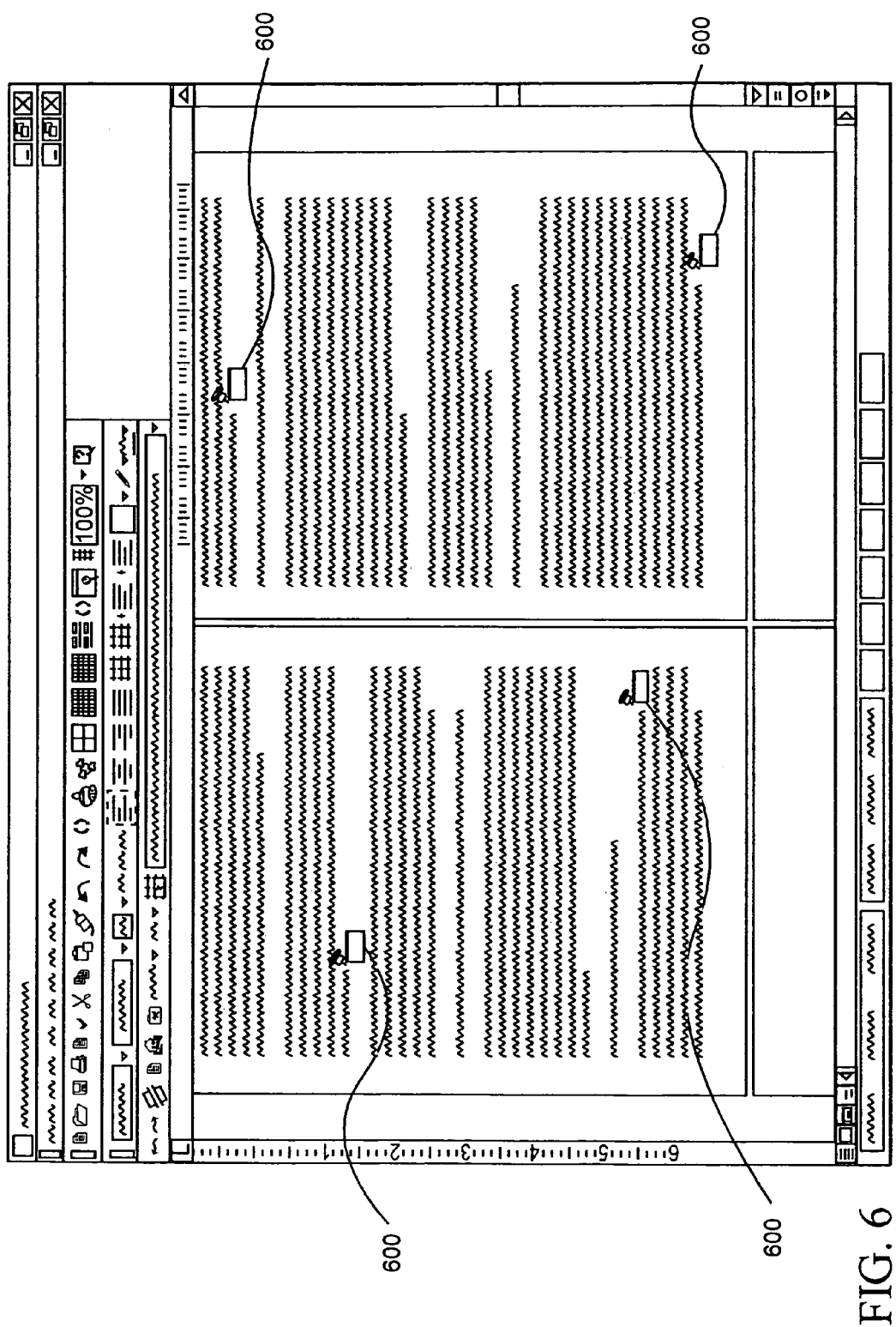
FIG. 6 is an illustration of a document (artifact) having multiple anchors each referencing an anchored conversation.

FIG. 6 depicts multiple Anchored Conversations within one document, represented in this example by the red pushpins and small thumbnails 600. Any one of these conversation spaces may be invoked simply by clicking on the thumbnail. This action results in the user entering the conversation forum, and the thumbnail opening to a conversation space like those shown above. In all cases, the user has not needed to do any set-up for the creation of this shared view. The existing document (in this instance in Word) is the one which colleagues are already working on, and the views offered in the application are exploited for getting an overview of where Anchored Conversations have been inserted.

Figure 7:
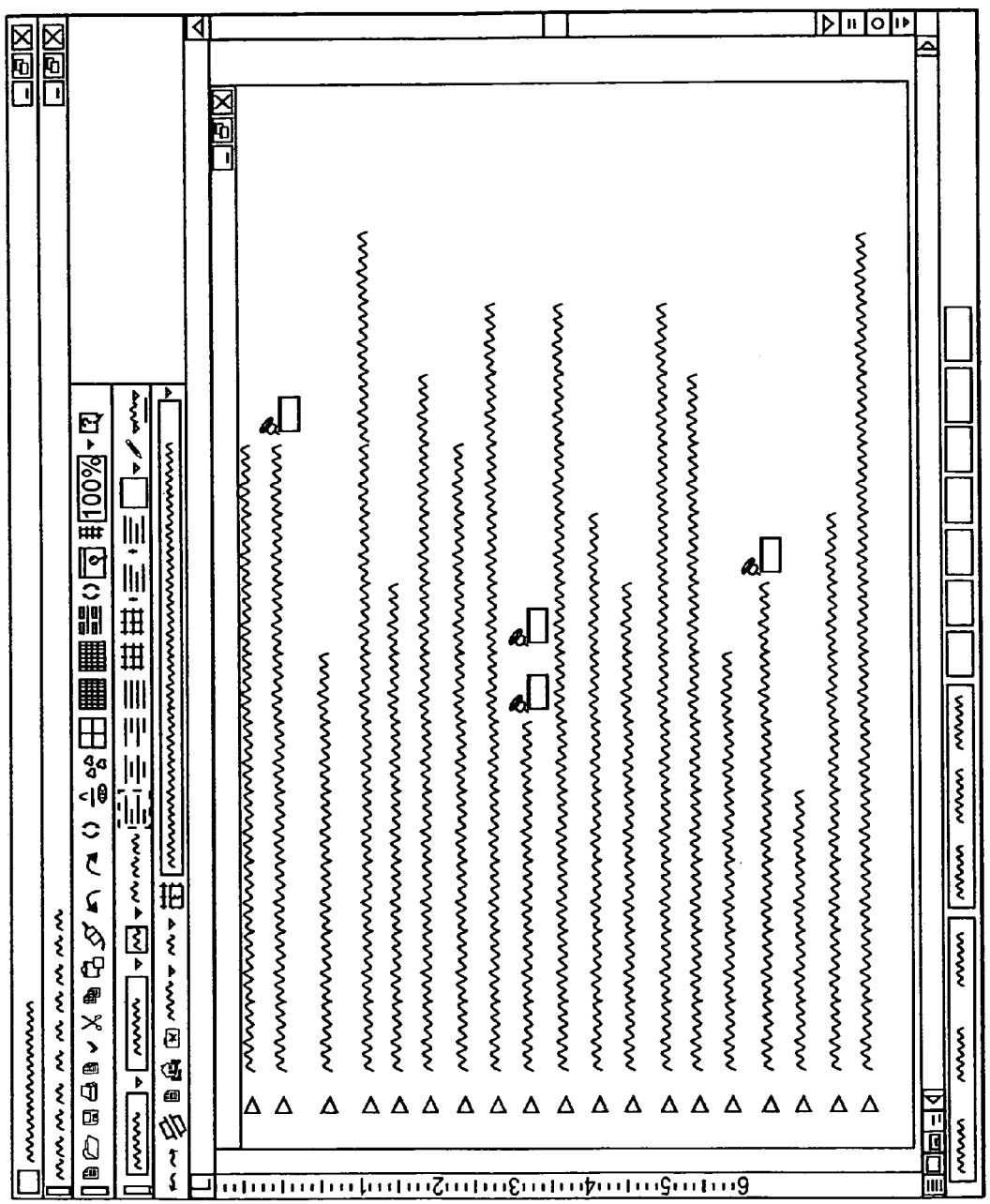
FIG. 7 is an illustration of an outline view of a document (artifact) having visual cues depicted.

An alternative view of the document is shown in FIG. 7, where the text editor's outline view is offered. So, sections in which Anchored Conversations have been inserted are marked with the same visual notification cue. In one embodiment, a user of an artifact with anchored conversations may invoke a save as new function, which saves the artifact without the anchors currently in the artifact (creates a clean copy of the artifact without anchors).

Details of Using Anchored Conversations

Creating Anchored Conversations

The Anchored Conversation application integrates with existing documents. Therefore, the user is able to insert an Anchored Conversation very simply into a document using, for example, an application interface (e.g. a macro) command. Thus, an application either has built-in capability or a modified template (Word, for example) containing a macro (anchor command, for example) that places an anchor into an artifact of the application.

Issuing this command results in the Anchored Conversation interface appearing at the location selected. Once inserted, relevant colleagues can be contacted by selecting them from a colleague list (buddy list, for example), or typing their contact information into an Anchored Conversation text box. In one embodiment, a place anchor command calls an ActiveX command and starts a macro, that contacts the conversation coordinator to initiate a conversation client and contact selected colleagues. The buddy list can be maintained in any fashion and may be achieved using current technologies, e.g. AOL's Instant Messenger Buddy List, IRC, etc.

Responding to Requests for Conversation

If an Anchored Conversation has been created and colleagues invited, a notification is sent to the desktop of all those invited. The recipients receive a simple dialogue box notification, which, when accepted will open the Anchored Conversation space and the document in which the conversation space is anchored at the relevant location. The document in which the conversation is anchored is a copy of the original master document.

Leaving Anchored Conversations

Once a conversation is ended the Anchored Conversation window can be closed, and will return to the thumbnail marker in the document.

Detaching Anchored Conversations

Anchored Conversations can be "unhooked" or temporarily moved from their location, as shown in FIG. 4C. Unless anchored somewhere else (i.e. their anchors reset) they return to the place in which they were initially placed on being closed.

Logging Conversation and Activity in Anchored Conversations

All conversations are logged and stored in a central Anchored Conversation Database. All other events, such as entering and exiting from a conversation space are also recorded. All events including actions and text chat are time-stamped. Logs can be reviewed by document, by application, by creator, and both text and time stamp searches can be issued (via the conversation coordinator, for example). Many forms of displaying such logs back to the user are possible; for example, composite or aggregate logs are possible.

Context Storage, Activity Storage and Anchored Conversations

Context Storage for Anchors

Anchors are located in documents and are associated with textual, graphical, or other material that is local to their location. If an anchor loses its context (e.g. the local words, sentence, paragraph, etc. with which it is associated is deleted) then the anchor becomes associated with the document as a whole. If the document itself is deleted, the Anchored Conversation is then accessed through the Conversation Database.

Activity Storage

Anchored conversations have associated with them a log of places to which they have been attached, and events that have happened to them (e.g. being created, being detached, being moved). These represent metadata over the document-related activities and communications (information put in a document or attached to a conversation relevant to maintaining the conversation, document or anchor ID's, for example).

The conversations themselves are stored in the Conversation Database, and, unless explicitly deleted by the user, are available for querying. In one embodiment, the Conversation Coordinator/Manager performs any querying.

A Scenario of Use

To illustrate the use of Anchored Conversations in a work setting, the following scenario is presented.

Background for Scenario

Belinda, Carleen and David are colleagues working on a project. Their work involves collection and discussion of data from geologic field sites and production of summary reports, research papers and research presentations. They work on month-by-month rotation, i.e., they work a month on and then are off for a month. Belinda and Carleen work on the first rotation, i.e., at the same time, and David works on second rotation.

Time zones and geographical location separate Belinda and Carleen. Carleen and David work in the same geographical location but not on the same rotation, i.e., not at the same time. Thus within this group there are both synchronous and asynchronous communications, and the degree of lapse between writing and reading can be as short as a few minutes for Belinda and Carleen, to a month, especially for David who may need to catch up on decisions taken early in the previous rotation. Their activities can be represented as shown in Table 1.

TABLE 1

Communications possibilities based on temporal and geographic working set-up for collaborators Belinda, Carleen and David.

|  | Same Place | Different Place |
| --- | --- | --- |
| Same Time | None of the colleagues are ever in the same place at the same time. | Yes for Belinda and Carleen who work in different geographic locations. These are in different time zones, but they often overlap in work hours. No for David, who works on a different rotation from the others and is never available for synchronous conversation with either of them. |
| Different Time | Yes Carleen and David work at the same geographic location but at different times. | Yes Belinda and Carleen may converse asynchronously due to their being in different time zones. David will converse with both Belinda and Carleen asynchronously as they are always in different locations. |

They use the following applications in their work: a spreadsheet and graphing package, a text editing application and a presentation package like PowerPoint. They collaborate over documents in all of these applications. They often need to work in a loosely coupled way, and send each other documents for review, but they also need to discuss specifics of the data within these documents and offer comments to each other during the process of co-authoring documents. These discussions are instances of "object laden" conversation. Their work conditions require that both synchronous and asynchronous communications be possible.

There are a number of problems with the current means of communicating for such "object laden" conversation. Most of the issues surround the granularity at which artifacts can be shared. For example, telephone and voice mail suffice to offer meta-information about the evolving work artifacts but the colleagues negotiate to achieve a shared context (by printing copies of a document or by opening applications on their respective desktops). Email can be used to send attached documents. However, again, navigation to specific points for discussion within documents is specified separately, for example by specifying locations in the document, such as "paragraph 2 of page 3, sentence 3".

However, without a shared window, there is little feedback as to exactly what the collaborator is looking at except by inference. Thus, conversational statements are stripped of their context, a context that needs to be recreated by each individual, following the conversational or textual pointers given. Video communication tools pose a number of problems. It is hard to work with the materials themselves, as sharing of details of the texts is problematic without setting up a dedicated document camera. Asynchronous sharing using this method also poses problems. Shared file stores such as DocuShare and BSCW suffer from the same problems as email in that navigation to specific points in the texts which are being referred to need to be made separately, by email or telephone. Therefore the granularity of the shared objects is at the level of files and folders, and not at the level of the text within the documents. Synchronous tools like AOL Instant Messenger and MUDs and MOOs enable the pasting of text, data, code, etc. into the shared window, but as is the case with email, this action results in the loss of the context surrounding the material which is being transmitted.

Scenario of Anchored Conversation in Use

Belinda opens the document where Carleen has been summarizing the latest data analysis. Almost immediately she realizes that an ambiguity in the data raises an issue about whether or not the Babar Site needs further exploration. She wonders why Carleen hasn't pointed out that ambiguity and immediately starts an Anchored Conversation at that point in the document. Belinda can start an Anchored Conversation by selecting a location in the document, clicking and inserting an Anchored Conversation. She, Carleen and David have been specified to be members of a work group that provides quick access to all addressing needs for requesting a conversation.

She types Carleen and David's contact names. This sends a notification to each of them that Belinda wishes to discuss an issue with them. If they are logged on and able to respond, they can accept the invitation. Accepting the invitation results in the relevant document being transmitted, the relevant application starting and the document opening on both Carleen and David's desktops, at the place where the Anchored Conversation is located. The Anchored Conversation window is located at the place in the document which Belinda wishes to discuss.

In this instance, Carleen is not at her computer (and David is not on shift this month). Belinda continues to work through the document and data analysis. Further on in the document, she finds another point in which she believes the data suggests results different than Carleen has indicated. Again, she inserts an Anchored Conversation. There are now two Anchored Conversations in the document, both inviting Carleen and David to join Belinda. Each, however, is at a different location in the document.

Synchronous Use of Anchored Conversations

Belinda continues working, most recently wondering about the data for the Agar site. Carleen comes back to her desk and notices that she has an invitation to join Belinda in conversation. She clicks on the "Accept" and is immediately in the Anchored Conversation where Belinda was most recently active (i.e. in the section about the Agar site data). Note that Belinda has actually invited Carleen to join her in several locations in the document but only one invitation appeared on Carleen's desktop since all instances were similar in that a) they involved the same document and b) they involved the same group of participants (Describing one embodiment of the present invention, other embodiments are possible, for example, displaying multiple similar invitations allowing Carleen to selectively respond). Such a set of Anchored Conversations creates a connected space of conversations. A system default is to locate a newcomer in the container most recently active.

When Carleen accepted the conversation, the data document opened on her desktop at the location of the most recently active Anchored Conversation or the conversation that initiated the most recent request. Other scenarios are possible, initiating the first conversation request, for example. She can tell, however, that there are additional Anchored Conversations in the document. She reads Belinda's comments where she lands and starts replying. Soon she and Belinda are in a discussion about the interpretation of the data about the Agar site.

When they reach some agreement about how to summarize the Agar site data, Carleen clicks on an anchor for another conversation in the document. Belinda sees that she is now active elsewhere and may or may not choose to follow her to continue a conversation about a different place in the document.

Asynchronous Use of Anchored Conversations

A month later as David is getting back into his work routine, he notices the Site Report document. He starts browsing through the document, noting that there are Anchored Conversations attached at various locations in the document. However, it's not until he gets to the conclusions about the Agar Site that he has any questions about the data or its analysis. Reading about the Agar Site data, he wonders why Belinda and Carleen didn't include data from last December. He clicks on the Anchored Conversation at that point and scrolls quickly back through their conversation. Nowhere does it mention the data of the previous December. He types "December?" into the Anchored Conversation and is moved into the Anchored Conversation at the Introduction where, in fact, Belinda and Carleen had talked about the December data. He consults the metadata for this Anchored Conversation to see when Belinda and Carleen were discussing the topic. He is reassured that this conversation took place after the final December data had been analyzed.

David is generally satisfied with their decision but decides to add in a note to that Anchored Conversation that he thinks they may want to make an explicit point in the document itself with the Agar site data in relation to the data collected in December. He knows that neither Belinda nor Carleen are available but that they'll see the document conversation space has been modified when next they access the document. A notification appears in their conversation space similar to a conversation request identifying that David has added a note.

Technical Details

Anchored Conversations are synchronous and asynchronous communication locales (communications that occur at a location at which an activity occurs, a place in a document, for example). In one embodiment, the communication medium is a text-based mechanism such as a chat space. However, all possible communication mediums are applicable, including sound and video, for example. Unlike chat spaces, they can be anchored to documents and other digital workspaces (e.g. web pages). Unlike chat spaces which are each separate, Anchored Conversations can also be linked to each other and other documents (document links, for example). They have access to information about work contexts around which conversations are taking or could likely take place.

A set of capabilities and interfaces from one embodiment of the present invention for implementing Anchored Conversation (hereinafter referred to as AC for Anchored Conversation) are depicted in FIG. 8. A work artifact (e.g., a document) 800 is accessed within an application (e.g., word processor program) 810. Each anchored conversation within the artifact, when active, is encapsulated as an AC client (820, for example).

Each AC client contains representations with which a user may interact to initiate conversations and provides a user interface (See FIG. 4, 400, and FIG. 5C, 500, for example) by which a conversation about some aspect of the artifact may be conducted. Each client is associated with an anchor (830, for example) that marks a place within the artifact (e.g. local text, local graphics, local objects, local cells).

An application-conversation interface (ACI) 840 is added or made accessible to each application supported by the Anchored Conversation system. The ACI is responsible for the access and manipulation of application operations and data relevant for anchoring an AC client within an artifact (e.g., accessing surrounding text) and for other conversation operations.

A conversation coordinator 850 is responsible for maintaining communications between anchored conversations and other conversation clients (e.g., 'unanchored' chat space clients). The coordinator also accesses a conversation database 860 containing the conversation history and access control data. The remainder of this section details the operations and flow of information between these capabilities.

Other conversation clients 870 communicate via respective conversation coordinators with the conversation coordinator 850. Other Anchored Conversations and associated applications communicating with the anchored conversation client 820 are shown as ACI application 880.

Anchors

In one embodiment, anchors (830, for example) are embedded in the artifact and mark a location within the location reference frame of the artifact. The location reference frame may vary depending on the type of application and/or artifact (e.g., character position within a sequential file or [x,y] coordinate in an operating system window). The anchor also includes a representation that identifies a position within the artifact and an associated conversation client with which a user may interact. Example representations for the anchor include a bitmap image (thumbnail 410, for example), highlighted text, or some combination of text, graphics, and sound. The anchor representation may be static or may change in value based on information obtained directly from user input, from the associated conversation client 820, or through the application-client interface 840. A user may interact with the anchor representation (e.g., pointer and menu events) to initiate and terminate conversations, move or delete the anchor, or change dynamic parts of the anchor representation. This information may similarly be provided from other distributed sources through the AC client or ACI.

An anchor encapsulates information including but not limited to the following attributes:
  Anchor representation (e.g., both active and inactive icons and/or text); and
  Context information about the artifact (e.g., location, surrounding content).

The anchor also includes an implementation for operating on user inputs to the anchor (starting the associated conversation client 820, for example). Anchor implementations vary depending on the type of application and/or artifact and include Java Applets, ActiveX controls, or other such embedded software structures.

One implementation well suited to Microsoft operating systems (e.g., Windows 95/NT/98) and applications (e.g., Word) is the development of small ActiveX controls as the anchors for conversations. Each instance of the control represents a specific AC and can determine and export its screen condition (location, focus, exposure etc.). This information can be used by the other areas of the AC architecture to attach a conversation to an area of an application and screen. ActiveX controls can easily be placed into most Microsoft documents (Word, Excel, PowerPoint and IE4) and are treated as parts of the flow of content within a document. Consequently as the document itself is changed and edited, the anchor implicitly maintains its position within that document, moving with the text it was originally added into.

In one embodiment, the anchor is an ActiveX component inside a word inline shape. The inline shape can be a range of text, a picture or graphic, etc. See pushpin (part of 410, for example), which, in this embodiment, would be a frame image of the ActiveX component inside an inline shape which contains the entire anchor construct. The ActiveX component is a set of code relating to the communication between the application (Word in this example), and the ACI (and API of the application). A double click on the pushpin passes an event to the ActiveX component which dispatches information (information to start-up a conversation, for example) to an appropriate portion of code (or code module) in the ACI (Word Macros 910, described below, for example).

Anchored Conversation Clients and Other Conversation Clients

Each anchored conversation within an artifact is encapsulated as an anchored conversation client. Each AC client provides a user interface (UI) by which a conversation about some aspect of the artifact may be conducted. AC clients are associated with anchors located within an artifact. AC clients may be associated with no anchors (conversation about the document), one anchor (single topic conversation), or several anchors (multiple topic conversation) located in one or more artifacts. In the last case, one anchor can be considered its primary visual attachment i.e. this is the artifact anchor which the AC homes to although other anchor points may be valid for the AC.

The AC client may be active (i.e., participating in a conversation) or inactive (e.g., dormant, sleeping, non-resident). Each AC client UI provides a mechanism by which a conversation with one or more other clients (AC or other clients) may be conducted (a conversation button that leads to a window requesting participant information or an address, for example). The conversation UI may be a separate operating system window or an embedded object floating within an application. Each AC client UI may be invoked by a user by interactions with the anchor (described above). The location of an AC client UI of an active conversation is bound to the current location of the anchor (maintained in close proximity to the anchor, for example). As the anchor moves and changes visibility, the AC client UI moves in a corresponding manner and changes its visibility. Motions include movement of the window in which the anchor is displayed and motions of the content in which the anchor is attached (e.g., pan, zoom, scroll).

The AC client UI may be temporarily de-anchored (or 'unhooked' from the anchor by a user input operation (e.g., menu or pointer event). The AC client UI may then be positioned independently from the anchor while maintaining all other relationships and information flow associated with the anchor. The client may be permanently de-anchored, in which case the UI may be associated with the artifact as a whole (e.g., as part of beginning or ending footnotes) or may be disassociated from the artifact (e.g., as a freestanding conversation client).

The AC client 820 permits the exchange of conversation elements (e.g., text, graphics, audio or other multimedia clips or streams) between other conversation clients. When the user inputs any conversation element, the AC client uses the facilities (described below) of the conversation coordinator 850 to distribute the elements appropriately. Users may also enter commands in the form of text command lines that are distributed to other clients. Commands include anchored conversation specific operations (e.g., anchor representation or location change, adding and deleting anchors, conversation state change such as and initiating) or artifact/application specific commands (e.g., cut, paste, format changes). Each AC client may receive command information from other clients and is responsible for interpreting those commands and performing the related operations. Errors in processing these commands may be reported back through the conversation channels if error reporting is enabled for a client. Commands that are artifact/application specific are executed through invocation of the ACI.

The AC client accesses the application conversation interface (ACI) for requests for context information (e.g., current anchor location, surrounding context) and for making updates based on artifact/application specific command processing. The ACI may in turn access an AC client in the following situation: upon invocation of an inactive AC client by an external client, the ACI may be used to invoke a given artifact, direct the users' view to the appropriate anchor point, and open the conversation.

The AC client accesses the application conversation interface (ACI) for making connection to other conversation clients (including checking access control rights), receive history data upon AC client initialization or upon request from the user, and communicating conversation, commands, anchor changes, and conversation state changes (although some implementations such as Internet Relay Chat-based clients may allow direct communication to external locations).

An anchored conversation client encapsulates information including but not limited to the following attributes:

Ongoing conversation information including conversation content and connection data;
Conversation history;
Conversation control state (e.g., error reporting, indication if the client is unhooked from its anchor, on other state indicators); and
Context information about the artifact and anchor (e.g., location, surrounding content).

AC client implementations vary depending on the type of application and/or artifact and include separately running programs (e.g., operating system windows containing Java or Visual Basic programs), operating system agents (e.g., Microsoft Agents), or embedded application-specific elements (e.g., Java Applets, ActiveX controls, or other such embedded software structures) that may float over text. Fluid Document annotations (i.e., annotations in context) that have been modified to be dynamically updated might also be used for anchor and/or AC client representations. Fluid document annotations (fluid links) are described in Zellweger et al., "Fluid Links for Informed and Incremental Link Transactions," ACM Hypertext '98, 1998, 50–57, and Chang et al., "A negotiation architecture for fluid documents," UIST '98 Proceedings of the 11th annual ACM symposium on User Interface software and technology, pages 123–132, each of which is incorporated herein by reference, in it's entirety.

Separation between the conversation database 560, the AC clients and the applications permits the integration and coexistence of different approaches to embedding AC clients into applications—relying on the most suitable method for an application (e.g. ActiveX controls for MS word and Java applets for Web pages). This separation is achieved by loosely coupled modules (separate but linked, linked via UDP messaging or http interface, for example) having separate functional components.

The conversation communication may be implemented upon existing network standards, including higher level communication mechanism such as Internet Relay Chat (IRC) or lower level network connection (e.g., UDP, TCP/IP) provided in Java and other languages.

In one embodiment, the present invention utilizes the IRC protocol for anchored conversation implementation. An AC client may provide a much simpler interface than a standard IRC client to hide the unnecessary functionality of IRC (other protocols may also be applied, CU-SeeMe, AOL instant messenger, and ICQ, for example).

A number of chat commands are supported including help, Client-To-Client Protocol (CTCP) commands, log control, etc. IRC thus provides the basic communication mechanism for anchored conversation. Each AC client is linked to an IRC channel that holds the discussion related to the content of the artifact associated with the AC client's anchor.

In addition to IRC support, an AC Client includes the following components:

Command Interpreter

A command interpreter parses AC command text and executes the appropriate action. The command interpreter may be supported by parser generators (e.g., Lex/Yacc) and/or a command line utility (e.g., Java intrinsic functions, freeware function libraries (see www.freewareweb.com). The interpreter is instrumented with calls into the ACI for application/artifact specific commands and the IRC command syntax for conversation specific commands.

Anchor Tracker

An anchor tracker keeps the AC client window positioned above the associated anchor. The ACI provides the location of the anchor and the anchor tracker moves the client window. Tracking may be event driven or by polling of the location.

History Component

A history component that displays the conversation history and accepts history updates from the conversation coordinator.

UI Elements

User interface elements added to the IRC client user interface elements include menu/pointer selections for history requests, anchor changes, conversation state change (e.g., close a conversation, unhook the conversation window from the associated anchor).

Application-Conversation Interface

Each application supported by the Anchored Conversation system is augmented with an ACI (840, for example). An ACI is responsible for the access and manipulation of application operations and data relevant for anchoring an AC client within an artifact and for other conversation operations. Some operations of the ACI are specific to an individual artifact (e.g., listing anchor points in a specific document) and others are applicable across all artifacts associated with the application (e.g., locating the application window on a display screen).

An AC client accesses the ACI for requests for context information (e.g., current anchor location, surrounding context) and for making updates based on artifact/application specific command processing. The ACI may in turn access an AC client in the following situation: upon invocation of an inactive AC client by an external client, the ACI may be used to invoke a given artifact, direct the users' view to the appropriate anchor point, and open the conversation.

The ACI may include an Applications Programming Interface (API) of an application (Word, for example) and wrappers, or extensions to the API. The wrappers or extensions would be programs that wrap around, or utilize standard API routines to perform some function. The wrappers could be part of an artifact (Word document), or a template within the application, or part of the application itself. Alternatively, the ACI may be a program apart from the application that utilizes API that has wrappers that again utilize standard API routines. As with each part of the invention described herein, many alternatives exist in how a particular piece would be implemented, and the actual format of implementation, within the scope of the teachings presented herein, are left open to the software or system designer.

An ACI may encapsulate information including but not limited to the following attributes:

A list of AC clients embedded in an artifact;

Locations of application and artifact windows; and

Versioning data for shared artifacts that are part of an anchored conversation.

ACI implementations vary depending on the type of application and/or artifact and include separately running programs (e.g., operating system windows containing Java or Visual Basic programs), operating system agents (e.g., Microsoft Agents), or embedded application-specific elements (e.g., Java Applets, ActiveX controls, macro definitions, scripting language components, or other such embedded software structures).

The ACI has the following components:

Request handler for AC client requests;

Artifact access functions for querying the content of an artifact, including anchors; and AC client initializer that responds to conversation coordinator requests to invoke or refresh a given artifact or artifact version, navigates to the appropriate anchor point, and open an AC client.

One particular implementation of an ACI may be realized as a combination of a set of specially built embedded macros for Microsoft Word and a Java module. The macros enhance the standard Word functionality through a set of keystrokes and menu options which allow the insertion of new anchors into the document, deletion of old anchors, moving anchors around etc. The "anchors" being manipulated by the macros are the specialized ActiveX AC anchors (see Anchors above). The Java module manages the flow of requests and information from these anchors to the AC clients and visa versa—sending requests from the AC clients and conversation coordinator to particular Word documents and anchors within them.

Conversation Coordinator

A conversation coordinator resident on each host computer running AC clients is responsible for maintaining artifact consistency and communications between anchored conversations and other conversation clients (e.g., other IRC clients). The coordinator also accesses a conversation database containing the conversation history and access control data.

A conversation coordinator may also encapsulate information, including, but not limited to, the following attributes:

File locations of artifacts being shared as part of an anchored conversation.

Locations (e.g., file paths, Universal Resource Locators, socket identifies) for conversation database(s).

Connection information (e.g., file paths, Universal Resource Locators, socket identifies) for communicating with other conversation clients.

Coordinator implementations include separately running programs (e.g., operating system windows containing Java or Visual Basic programs), operating system agents (e.g., Microsoft Agents), or embedded application-specific elements for coordinator capabilities implemented within a given application (e.g., Java Applets, ActiveX controls, macro definitions, scripting language components, or other such embedded software structures).

In one embodiment, the coordinator has the following components:

A request handler for AC client requests is an event loop that waits for requests and provides the requested resource or dispatches the request to other parts of the system (e.g., conversation database); and A connection manager is an event loop that starts conversation flows between conversation clients.

When a connection request is made, the coordinator retrieves access control and client location information from the conversation database and establishes the allowed connections using the underlying communication system.

Conversation Database

One or more conversation databases (860, for example) manage information about the conversation history and access control. Any distributed database mechanism (e.g., shared file management, relational database management system) that provides request/response processing for this information may be used to support anchored conversations.

A conversation database may encapsulate information, including, but not limited to, the following attributes:

Conversation history including conversation elements (text, graphics, and other related media), command invocations, anchor changes, anchor context (e.g., nearby text, graphics, or location indicators from the artifact), conversation state changes, and shared artifact version data (e.g., most recent version); and Access control data include access control lists, user accounts and privileges.

In one embodiment, the database has the following components:

Request/response handler for coordinator/AC client requests;

User interface for database administration; and

Low level database access methods for conversation access control and history requests.

Anchored Conversations can be placed into any application; we refer to all document contents as "text" below, even where the content may be graphical. Anchored Conversations, as described above, include, but are not limited to, the following features:

- The user can anchor or affix conversations into work documents;
- Users can specify conversations to be anchored to a specific location, temporarily detached (as in FIGS. 4 and 5 above) or completely detached, whereby the conversation is not associated with a document;
- An application provides access to conversations that are associated with it (i.e. that are anchored into it);
- Individual Anchored Conversations provide access to documents into which they are anchored;
- The conversation coordinator provides access to conversations and related applications. Through the metadata, the user may have a variety of views onto those;
- Anchored conversations provide recording metadata over documents. For example, the automatically logged history of anchor creation, placement and navigation, and through the conversations that users create in synchronous or asynchronous collaboration;
- Anchored Conversations "know about" their contexts (i.e., are linked to certain data about their location in an artifact and/or their surrounding context), or the places into which they are placed and use this information to automatically recreate context for users;
- Anchored Conversations automate the creation of shared, contextualized, activity locales for users;
- Anchored Conversations are able to move with their settings;
- When detached, Anchored Conversations may not move with their settings, but remember the setting to which they last belonged and are able to automatically return to those settings when the anchors are reset;
- Anchored Conversations provide shared context without implementing shared screens;
- Users can navigate documents based on dynamic, socially relevant and socially constructed landmarks;
- Documents to which conversations are anchored do not require re-representation;
- Users can share conversations and actions in the Anchored Conversation space while sharing a background view without moving to WYSISIS screens;
- Users have access to the history of their conversations over documents in the context of the documents themselves;
- Anchored Conversations support the synchronous and asynchronous collaborative creation of annotations within documents while collaborators are not collocated;
- Anchored Conversations provide a mechanism for landmarking documents with points of importance;
- Anchored Conversations can be invoked by (1) accepting an invitation to converse, (2) by opening a document and selecting a conversation that has been placed there or (3) by accessing a conversation through the Conversation Coordinator;
- A conversation provides access to an associated application and, when appropriate, to the specific context within that application;
- Anchored conversations embody a new metaphor for lightweight communications tools. We call this Turning CSCW Inside Out because we invert the relationship between communications and existing artifacts. Anchored conversations carry the conversations to the work texts;
- Anchored Conversations foreground text-based, work related navigation through document conversations as well through application or document level navigation; and
- Anchored Conversations allow the sharing of work texts at a fine level of granularity. Anchored Conversations allow users to share the content of documents and not simply the documents themselves.

By using Anchored Conversations the text (or any content, graphics, for example) provides the location or the place for conversations. This alters the standard view of place-based communication tools.

Figure 9:
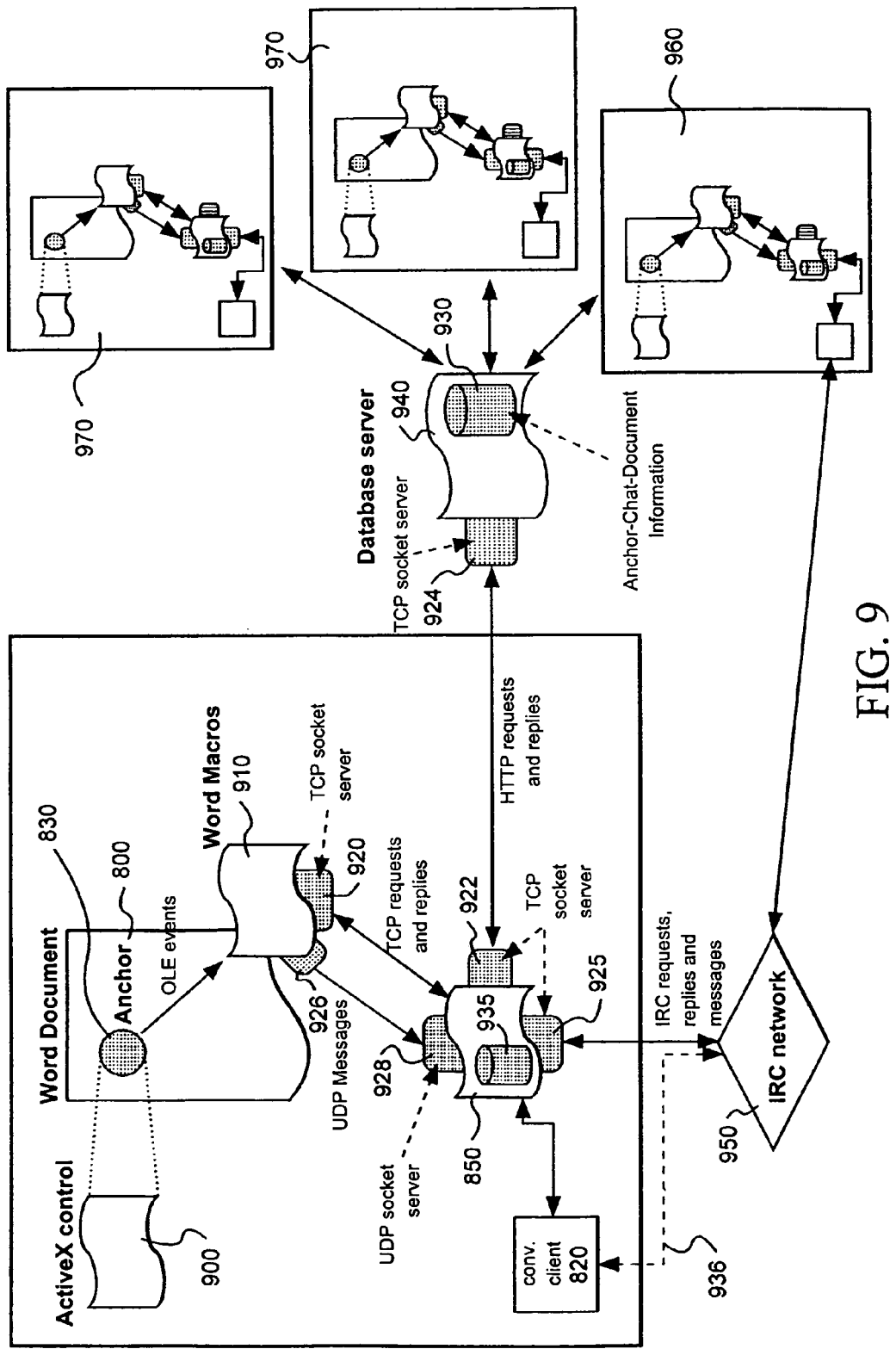
FIG. 9 is a flow diagram of major components and communications links for implementing an embodiment of the present invention.

FIG. 9 presents a flow diagram between the major components of one embodiment of an anchored conversation system according to the present invention. A Word document 800 has an anchored conversation 830 which is linked to ActiveX Control 900. Upon activation of the anchored conversation 830 (double clicking on an associated thumbnail, for example), the control 900 initiates one or more Word macros 910 (or another ActiveX control, for example). The macros 910 send information (TCP requests and UDP messages, for example) to the conversation coordinator 850.

In one embodiment, the conversation coordinator 850 includes a data store that caches relevant parts of the database. The relevant parts include any one of the entire conversation, anchor positions, or other data about a current conversation coordinated by the conversation coordinator 850.

The conversation coordinator 850 communicates with a database server 940 (and main remote database 930) to retrieve previous conversation information, if any, associated with the anchored conversation initiated by the anchor 830 and to store any new, current or contemporaneous conversation information. The conversation information includes the conversation itself and any metadata regarding the conversation (anchor position, and/or other context information, for example). The database server also communicates with other related and non-related communications clients (960, and 970, for example).

The conversation coordinator 850 also communicates with a network or other communications medium/devices, illustrated as IRC network 950, for example, to initiate and maintain particulars of the actual conversation flow of the anchored conversation (e.g., inviting or closing a conversation). Any type of conversation client or medium sufficient to transmit the content of the conversation may be utilized to maintain these communications.

The IRC network 950 communicates with a second conversation coordinator operated in association with another location (user) (960, for example) participating in the anchored conversation. Other variations or modifications of the program flow thus illustrated will now be apparent to those skilled in the art.

Example Implementation

The following is an example implementation of the present invention. The example is intended to show one possible way of implementing the constructs of an anchored conversation system, particularly in the case of Microsoft Word. However, this example is not limited to Microsoft word or any of the specific teaching herein, as these same teachings can be applied to other applications, word processors, spreadsheets, and graphics packages, just to name a few examples, and need not rely on any specific implementation detail to perform the processes described herein.

One embodiment of an Anchored Conversation system consists of four main parts (and example implementation language shown in parenthesis):

1. The ActiveX control anchor (VB6)
2. A set of Word Macros (VBA)
3. A local conversation coordinator (Java)
4. A single main remote database (Java)

Each of these parts communicates using a variety of methods, (see FIG. 9, for example). The ActiveX control 900 associated with anchor 830 uses an OLE event mechanism to raise events when an on-screen state change of the anchor 830 occurs. These events invoke specific Word Macros and if the functionality of the event requires communications are translated into equivalent UDP messages that are sent out to a local port.

The conversation coordinator 850 receives (via UDP socket server 928, for example) and responds to these messages by updating the local chat windows as needed. In one embodiment, the conversation coordinator 850 also maintains a replica 935 of the database 930. When the replica 935 is changed, each change is forwarded via an HTTP request (or other communication mechanism) to the main remote database 930, which acts as a hub and sends the request to all other currently active replicas or backups. When such updates require the underlying Word document state to change (for example, when a user on a different machine moves or deletes an anchor) the Word Macros 910 receive and act on such requests (over their own TCP server 920, for example). The local manager (a local instance of the conversation coordinator) uses the Word Macros to query a state of the document (such as its filename, its ID, etc.).

The chats, or conversation clients, 820 for example, are supported by the IRC protocol. The Internet Relay Chat (IRC) protocol is widely used by a variety of specialized chat clients (e.g. mIRC on Windows platforms). Each client connects to a single IRC server, which itself is connected to other IRC servers. Messages flow from a client to its connected server to all other servers in an IRC network and then to each server's clients, where appropriate. Every conversation client in the Anchored Conversation system is mapped to an associated IRC chat channel and the conversation coordinator acts as an IRC client and as a conduit for messages that flow from the conversation clients to the IRC chat channels (in IRC network 950) and back. Alternatively, the conversation clients, 820 for example, may have their own individual connections, 936 for example, directly to the IRC network 950.

The architecture presented in FIGS. 8 and 9 allow conversation clients (chats, or chat windows) to be supported across a range of platforms. The management of chat windows and chat content (currently implemented within a Java application) are separate from the operating system specific applications to which the chats are attached. This allows any application that supports the Application Conversation Interface (ACI) API to be used by the conversation coordinator. Support from the conversation coordinator may be split into separate packages to build common add-on packages which the manager can integrate to support different applications.

The Structure of the Database

The "database" (main remote database 930, for example) stores the current state of all chats, anchors and documents which are entities, artifacts, or work artifacts known to the system. Its runtime implementation is a set of instances of Java classes for each of the entities. Each entity is supported by a set of methods for packing and unpacking their state into and from a textual form. This format is used to transport the instances between the conversation coordinators and the main remote database 930. The same format can be used to store the instances on disk at the remote main database or on backup media.

The three main database classes are StickyChat.Document, StickyChat.Chat, StickyChat.Anchor. Each instance of a document, chat or anchor has a corresponding unique ID (generated randomly, for example) which is allocated when the entity is first created or seen by the system. The most important information maintained by these classes is as follows: For each document:

Document ID, uniquely identifying the document;
IP address where the current master version of the document can be found;
Filename of the current master version at the host computer signified by that IP addres; and
A list of Anchor ID's which refer to all the anchors contained in this document.

For each chat:

Chat ID, uniquely identifying the chat;
A list of Anchor ID's that refer to the all the anchors this chat is associated with (typically only 1);
A list of members who are people who are allowed to use this chat;
The title of the chat; and
The ID of the anchor which the chat is currently attached to (important if it has more than one anchor). This is also known as its active anchor ID.

For each anchor:

Anchor ID, uniquely identifying the anchor;
A context, which is some text in the current master document where the anchor can be located;
The Chat ID of the chat the anchor is linked to; and
The Document ID of the document the anchor is contained in.

All known instances of each class are indexed in each database using three table classes: StickyChat.DocumentTable, StickyChat.ChatTable, StickyChat.AnchorTable. So given an ID to an anchor, chat or document, the current information about that entity can be obtained looking up the instance in the relevant table. By searching other tables, linked by Anchor ID, for example, an entire set of information may be obtained.

In one embodiment, the main remote database is fully replicated at each conversation coordinator. When each conversation coordinator starts it requests a copy of the entire database via an HTTP request. If no database can be contacted the manager may abort its startup, create a database, function without a database connection, or another fall back routine. In another embodiment, a more limited caching of the database is supported, maintaining only the most likely data to be retrieved (anchor locations, for example). In another embodiment, only the main remote database 930 is maintained.

Each conversation coordinator running a replica of the database provides several standard methods that the HTTP server calls in response to changes and updates to the database. The 'mergeX' methods (where X is one of anchor, anchors, document, documents, chat or chats) are called when the database needs to add or merge new instances of anchors, documents or chats into its current state. Each merge method accepts a parameter indicating the source of the update. This source is needed as the merge method will normally invoke a 'broadcastX' method to inform other replicas of the update (so that the source doesn't get the update itself).

For example, a new anchor is detected in a local document by a local conversation coordinator (via a UDP message received, for example). A new anchor instance is created and the local conversation coordinator's 'mergeAnchor' method is invoked with its own IP address as source (or 'null' or other identifier indicating the source). The conversation coordinator database is updated and it calls a 'broadcastAnchor' method. This method packages the anchor into transmittable form and sends it via an HTTP request to the remote database server 940. The remote database server's HTTP server unpacks the anchor from the request and calls its own 'mergeAnchor' method with the local conversation coordinator's IP address and updates its own database. Again, the merge method calls 'broadcastAnchor', which sends the same change out to all local conversation coordinators who have previously logged into the remote database—making sure each coordinator is not the original source of the update.

Here and throughout much of this discussion, the HTTP protocol and UDP messaging is identified as selected communications protocols to be implemented by the present invention. However, as will be appreciated by those skilled in the art, other protocols may be utilized for these communications (X.25, X.400, basic handshaking, e-mail, to list a few possible examples).

The Anchors

An anchor is responsible for maintaining and making available its on-screen state (its X, Y coordinates and if it is actually visible), its unique anchor ID, and the chat ID associated with it. It can signal changes to this information in two main ways. First, by raising standard OLE events, and secondly, by broadcasting the change via UDP to a local port (a fixed part, for example). As will be appreciated by those skilled in the art, application-specific implementations of these anchor functionalities will differ, although the second method is more generic.

For Word, the present inventors have developed Anchors in VB6 (Visual Basic 6) as an ActiveX control. ActiveX controls are persisted and saved along with the documents they are included into on MS platforms. Although the current control regime is described as being within Microsoft Word, the same principles apply to any document or application that supports ActiveX controls—PowerPoint, Excel, HTML web pages viewed with Microsoft Internet Explorer, Version 4.0 or later, etc.

The control uses a technique known as subclassing to receive Windows system events it would not normally get. In particular, it subclasses the container of the control and the WM_PAINT and WM_MOVE events which are generated whenever the control is repainted or moved. The control detects it is no longer visible by querying its graphical clipping region. These mechanisms have difficulties, (a) when the anchor becomes hidden when the user moves a separate window over it, and (b) when the main Word window is dragged around the screen, because events are not normally received. One method of solving both problems is to use a timer to "poll" the current state of the anchor (to get its current X, Y and to check its clipping region). In one embodiment, the polling is performed by an ActiveX Control, however the Word Macros, or a separate program could also be configured to perform this task.

While any polling method might not be ideal with respect to performance it is extremely reliable. Unfortunately, in Word there appears to be some conflict with a central timer used by Word. This causes Word to "refresh" its text state (check spelling, grammar etc.) on every event fired by a VB6 or Win32 timer—even although the timer does not perform any function related to the Word document.

One solution to (a) is to change how the chat windows associated with these anchors behave once the user is no longer using Word. So rather than knowing when the anchor is visible or not the local manager makes sure all chat windows associated with particular document through its anchors are not "top-level" windows when the application no longer has focus. This ability to detect the loss and gain of focus in the Word window is obtained through subclassing the main Word window itself (using another ActiveX control compiled into the OLE Custom Control file for the Anchored Conversation implementation, for example, the 'StickyMoveTrapper' control compiled into the 'StickyChat.OCX' file). One solution to (b) is to use the subclassing function to detect and refresh each anchors state whenever the window moves.

Active X controls follow a particular life-cycle which makes it difficult to tell when a control is actually deleted using only internally available events. For example, before a control is "destroyed" is receives a "write properties" request, which allows it to persist its state using standard ActiveX control mechanisms. When it is re-instantiated it receives a "read properties" request to allow it to extract previous state using the same mechanisms.

Unfortunately, difficulties arise if the 'write' request is being signaled because the user is deleting the control, or because the Word document is being closed. In the life cycle the "instantiate" method is called once when the anchor is first created and that is where the anchors unique ID and its associated chat ID are generated.

A 'terminate' method is called on each ActiveX control before it is destroyed. In addition, a control is not terminated if the reference count to it (i.e. the number of other variables pointing to the object) is greater than zero. This creates a cyclic problem when the ActiveX control is wrapped by an event receiver (see below) as the terminate method is not called because the event wrapper always has a reference to the ActiveX control.

Word Macros

The Word Macros provide a GUI interface to the user to manipulate the anchors in a document (add, hide/show etc.), and to provide a TCP-server based interface (again, other types of communication or interfaces may be utilized) to allow changes to the document, chat and anchor state to be reflected in the open document and management of an associated conversation client by a conversation coordinator. These changes include moving an anchor to a new position, creating an anchor at a certain text context (point in an artifact) and so on. In addition, the macros "wrap" all of the ActiveX anchor controls in a document to receive events related to their current status. Finally, as indicated above, the macros subclass the main Word window using another StickyChat (Anchored Conversation) control (In one embodiment, performed by the StickyMoveTrapper control) to receive changes in its on-screen position and its focus.

When a Word document containing these macros is first opened several "auto" events are fired ('auto_open' for the document opening and 'auto_exec' for the application itself starting). The macros trap these events and subclass the Word window to receive move and focus events. They check all InlineShape word objects in the document to see if they are anchors. An InlineShape is the OLE container that Word uses to contain ActiveX controls. In one embodiment, an anchor control is identified as an InlineShape object with an OLE class of "StickyChat.Sticky". For each control found the macros create a Virtual Basic (VB) wrapper object which is responsible for receiving the anchors OLE events and forwarding them to routines (macros, for example) which act on the event. Each VB wrapper object has a pointer to an InlineShape Word object in the document and the Sticky Chat anchor object contained in that InlineShape. Each VB wrapper object is held in a single collection for that document.

In addition to subclassing the Word window and wrapping each anchor, the macros create first and second hidden forms (code objects that do not have displayed visual representations). The hidden forms and their controls are a way of implementing (in Visual Basic) objects such as UDP socket 926, created by the first hidden form, and TCP socket server 920, created by the second hidden form.

The UDP socket 926 sends changes to the anchors state out. The first TCP control (TCP socket server 920) is a server and receives all incoming requests from the local manager (conversation coordinator 850 in this example).

Once a document containing anchors is opened the Word macros listen for (wait to receive events related to) external changes and requests on its TCP server, send anchor changes via UDP to a remote local port, and provides mechanisms (menu options or buttons, for example) to allow users to add new or modify existing anchors in the document.

For one embodiment, external requests into the TCP server are shown in table 2. All requests pass the necessary document ID and/or anchor ID's required.

TABLE 2

TCP requests serviced by the Word macros

| | |
|---|---|
| INFODOCONLY | Get information about a document (its filename) |
| SHOW | Make sure a particular anchor in a particular document is shown on-screen |
| INFOALL | Get information about all the documents open in this Word instance and the anchors contained within each |
| INFOANC | Get information about a particular anchor in a particular document, its X, Y position, on-screen visibility, chat ID and context. |
| INFODOC | Get information about a document including all its anchors information |
| ADDANCHOR | Add an anchor with a given ID and chat ID to a particular context (text string) |
| MOVEANCHOR | Move an existing anchor to new context (text string) in a document. |
| DELETEANCHOR | Delete an anchor from a document |
| CHANGEAID | Change the anchor ID of an anchor in a document |
| CLOSEDOC | Close a document |
| SAVEDOC | Save a document |
| SPLITDOC | Called when a local manager detects an inconsistency in the filename of a master document on this IP and this documents ID. In such a situation the user can specify that this document is the new master document or it is a copy. If it is a copy this call is made which removes all the anchor and allocates a new document ID. |
| HASDOC | Returns document information if the document is open with a certain filename and it needs saving |
| REFRESHANCHORS | Forces each anchor to refresh its current screen position and state |
| ENABLEANCHOR | Enables or disables an anchor from being interacted with (disabling causes the anchor to be greyed out and not response to being clicked). |

UDP messages sent out by the macros to the local manager in response to changes to the anchor and document state are shown in table 3.

| | |
|---|---|
| Removed | An anchor is no longer in the document |
| Click | A anchor has been clicked on |
| XY | An anchors XY position has changed |
| Vis | An anchors visibility has changed |
| Open | A document with a certain ID has been opened |
| Close | A document with a certain ID has been closed |
| Activated | A document has been activated (has focus) |
| Deactivated | A document has lost focus |

Table 3: UDP Messages Sent by Word Macros

The removed UDP message is generated whenever the macros detect a previously wrapped anchor has an invalid InlineShape (i.e. its been deleted by the user). The macros exploit the fact that the 'write' method is called on the anchor (which causes it to raise an event) prior to being deleted or saved. When this event occurs Word's application timer (of which there is only one which all macros share) is set to fire some seconds later. When the timer fires, all the anchors are checked for validity and any without a valid InlineShape container are considered deleted. It is worth noting that when a user "drags" an anchor around a document both the anchor and its InlineShape are destroyed and then recreated (with a new InlineShape) when the drag operation finishes. This operation is performed by the Microsoft Word application itself.

Whenever the macros intercept the subclassed Word.windows move event (e.g., the StickyMoveTrapper control discussed above), each anchor is forced to refresh its on-screen state, which in turn causes it to generate XY changed events etc. which are sent in an "XY" message.

Activation and deactivation of the main Word window is also trapped, generating a UDP message, as this allows the main local manager to change the "top-level" flag of the chat windows associated with anchors in the Word document. For example, while a user is working on the document, or scrolling its contents, or dragging the window, the chat windows can be repositioned to appear over the document at the anchors' position. When the user switches to a different application, a top-level flag on the chat windows may be disabled to prevent them from being displayed above everything.

The Local Conversation Coordinator

A local conversation coordinator runs on each users machine and is responsible for creating and managing the chat windows (820, for example) which are placed at the anchors coordinates, in one embodiment maintaining a replica of the main database, and coordinating IRC messages between at least one conversation client and the IRC network 950 and servicing conversation requests from other users.

The conversation coordinator runs four main threads that act on different aspects of the system. A UDP thread listens for incoming UDP messages from local documents and anchors. A TCP server thread is used as an IRC client interface to receive and send IRC messages. Another TCP server thread is used to act like a simple HTTP server, which is used to communicate with the main remote database and accept document requests from other users (via their conversation coordinator). Finally, the primary starting thread runs the GUI, updating and creating windows etc. In one embodiment, these threads are integrated. Alternatively, calling methods across threads may be utilized.

When the manager receives a request for one of its local documents (on the local filestore), it checks to see if the document exists and is currently open. If it is open (in Word) and needs saving the manager informs the user that a current up-to-date version of the document is required and asks if they want to save the currently open version. The manager then returns the file to the other local manager that requested it. The entire GET document request is serviced in almost exactly the same way a full HTTP server would return a document. Indeed, if the request is mimicked as a URL request from a normal browser the browser will simply get the file and the user can open it.

In one embodiment, an IRC client package used by the both the conversation coordinator and the database server (below) is the "Relay" Java IRC package. This is a set of classes (released under the Mozilla license) which understand how to send and receive commands and messages using the IRC protocol. To use the classes the conversation coordinator provides a class that implements the IRCApplication interface. This class receives events concerning the connection to the IRC server in general, rather than specific channels the user may be joined into. When the Relay package receives a message for a specific channel it asks the IRCApplication class for an instance of a different class—which implements the "IRCView" interface. There is one IRCView class instance per channel. The Relay package then invokes various callbacks on the view returned by the IRCApplication concerning that channel—people joining, leaving, messages being sent etc.—while the user is a member.

In one embodiment, IRC server used by the IRC clients in the conversation coordinators and the database server is a remote public server. To avoid user name and channel name conflicts the IRC view and application classes prepend a common sequence of characters to all channels and users used by the manager when interacting with the IRC chat system. In one embodiment, IRC channels are exclusive (by being password protected, or by only allowing invited users in), alternatively, exclusivity may not be enforced.

Each local conversation coordinator maintains local information about the Word documents and anchors which are currently open on the users machine, as well as all of the chats which the user is actually actively involved in (and therefore has a corresponding chat window open), stored in local datastore 935, for example. These lists are used by the mergeX functions so that they not only update the local database copy, but also notify various Word routines and the chat window about changes to the particular pieces of the database which concern them.

For example, when an anchor is added or moved in a document from another local manager, the HTTP server will invoke the mergeAnchor function. The merge routine checks to see if the anchor belongs to a document ID that matches a currently open word document. If it does then the Word document needs to be updated (the anchor added or moved). The same type of checks are made for locally open chats (member being added etc.).

In one embodiment, synchronization errors between the copies of a document and the master version are detected whenever a conversation coordinator of a copy tries to insert or move an anchor to a particular context within the document. If that context cannot be found then clearly the copy is out of date with respect to the master version and the user is asked if they would like to fetch an up-to-date copy of the document. Although the conversation coordinator knows that a document is the master, it treats all inconsistencies of a document with the database as a synchronization problem. This can cause the "master" to become out of synchronization with a "master" copy if a user adds an anchor to some new text in the master's copy. In such situations the actual current contents of the master are assumed to be correct and overwrite the state in the database.

User preferences, such as their username, email address and full name are stored in plain text file together with other variable parameters used by the system (the IRC prefix, server and port, the database server IP and port etc.). This file's name can be passed on the command line to the conversation coordinator, or if no file is specified the default name of "prefs.txt" in a current working directory or other preference mechanisms may be used.

The Remote Database Server

The remote database server 940 maintains the main remote database 930, which includes all saved document-anchor-chat information and is considered to be the 'correct' version, i.e., knowing who's logged on (running replicas of the database), and monitoring and logging all chat conversations for later searching and browsing.

Logging of chat conversations and actions takes place by connecting to IRC as a special database user. Whenever chats are created or joined by 'normal' users through their local managers the special database user is also invited. Invitations arrive through the IRC client interface to the database, which accepts and joins the channel. For each channel the database creates a simple IRC view, without a GUI, which simply logs all activity in that channel to a local log file. As long as there is more than just the database user in the channel the remote database stays in it. When the database user is the last user in the channel it automatically leaves.

In addition to the normal database-related HTTP requests (mergeX, etc.) the remote database server also services requests concerning the users of the system—who is logged on where, who can be invited to a chat, etc.

The same Java sources (and window's .exe) may be used for both a local conversation coordinator (830, for example) and the remote database server 940 because many of the classes are shared by each. The first command line parameter is used to differentiate between them and is specified when the .exe is first run. If there are no parameters, or the first parameter is "manager", then the exe is started as a conversation coordinator. If the first parameter is "server" then it starts as the main database (remote database server 940, for example). A second parameter, if present, is the path to the preference file used by the conversation coordinator (see above).

Bringing it all Together: How Chats Get Stuck

Elizabeth starts the local chat manager on her machine. The manager logs in to the main remote database and receives a copy of the current database state. The manager also connects to the IRC server that the chat channels will be created on.

Elizabeth opens a new word document containing the set of Sticky Chat macros. These present an additional toolbar allowing her to insert a new anchor and chat into the document. Elizabeth adds some text and inserts an anchor using the toolbar at the text insertion point. The macros check to see what the document ID is and since it doesn't have one yet a new one is created and added to the documents word variables (these are persistent between saves). This ID is persistent and stored by Word with the document and will always be subsequently available to all Word applications opening the document. The macros also check to see if the document is saved on disk and prompts Elizabeth to do so before adding the anchor. Saving is necessary because a master document is identified through a combination of the document ID, its filename and an IP address. The macros then create a new InlineShape with a StickyChat anchor in it and wrap the shape with an event-receiving object that is added to an internal macro collection. The anchor then instantiates itself, subclasses its container (the InlineShape) for position and state changes, creates a new anchor ID and chat ID, and generates a number of events (such as screen position changes and visibility changes). The wrapper object receives these events and the macros generate UDP messages corresponding to the events.

Elizabeth's local manager receives the first of these UDP message events and checks to see if a document with this ID has been seen before in the database. In this example it hasn't, so the manager queries the Word document through the macro's TCP server for details about it (including information on all the anchors in it), and creates a corresponding document and anchor object. If there was more than one anchor then several anchor objects would be created. These new objects are then added to the main document and anchor tables in the local database, and the changes are sent to the remote database through an HTTP request. The remote database adds these to its tables and broadcasts the same updates out any other currently connected managers (not including the source of the message)—none at this time.

The original UDP message continues to be processed and checks to see if the anchor ID is already known. If it wasn't then a new anchor object would need to be created. In this example the anchor ID does have a corresponding object in the database anchor table (see above) but the chat ID associated with that anchor is not. The manager proceeds to create a new chat instance and adds it to the local database replica (and sends the update off to the remote database). The manager creates a sticky chat window for the chat, creates a new IRC channel view to receive incoming chat messages, and joins the IRC channel with the same ID as the chat ID. In addition to joining the channel the manager sends an IRC invite request to the special remote database IRC user. The database will automatically accept this request and start logging the chat channel.

The manager finishes processing the original UDP message. If the message was a visibility change (in this example, making the anchor visible for the first time) then the manager shows the chat window created above. If the message was a position change, then the manager updates the on-screen position of the chat window. As Elizabeth drags the main word window around, or scrolls the document then the manager will receive changes to the anchor's position. Since entries now exist in the database for this anchor ID in this document ID, with this Chat ID, the UDP receiver requires no intensive processing for all subsequent on-screen changes.

When Elizabeth types lines into the new chat window each is sent by the manager to the channel associated with the chat displayed in the window. Because no-one else has yet been invited to the chat the only recipients are the remote database and the IRC view created for the channel for this user. When the Relay package receives the message from the IRC server it forwards it to the correct IRC view instance, which adds it to that chat's window. Effectively, Elizabeth's message is never directly added to the chat window when she types it but rather goes via the IRC channel.

A second user, Joe, is working on another machine starts his own local manager which logs into IRC and connects him to the remote database.

Elizabeth wants to invite Joe to collaborate on the document so she selects the invite option from the chat window's menu. The manager fetches a list of known users from the remote database using an HTTP request. This list is displayed and she chooses Joe. He is added to the members' list in the chat instance, and the change is sent to the remote database, and from the remote database to Joe's manager. Elizabeth's local machine also sends an invite request to Joe using the IRC protocol. The IRC server delivers the invite to Joe's local manager that pops up a dialog informing him of the invitation to the document.

Joe accepts the invitation and his manager sends an HTTP GET request for the master document associated with this chat on Elizabeth's machine. The document object is obtained from the anchor object's document ID property, and the anchor object is obtained using the anchor ID property of the chat. The actual filename and IP of the requested document is available in the document's object. Elizabeth's manager receives the incoming request and prompts her to save the document to disk as another user is requesting its current state. Elizabeth says 'yes' to the save dialog and the manager sends a SAVEDOC request to the word documents TCP server. The manager returns the file to Joe's manager.

Once Joe's manager has the document transferred to a temporary folder on his local filestore, it asks him where the file should be put before being opened. Joe selects a file and the temporary file is moved. Before opening the document the manager adds a special entry in its local 'goto' table which indicates the first time a particular document is seen locally it should be moved to a particular anchor. The manager then opens the transferred Word document and finishes the invitation acceptance response.

When the document opens with the Word macros inside it sends an 'open' UDP message that is received by Joe's manager. The manager can find an entry in the database for the document and all of its anchors but has an outstanding entry in the 'goto' list for the document. The manager sends a SHOW request to the documents local word macros via a TCP request for a specific anchor ID.

The word macros respond by making that anchor available on-screen, causing it to fire various UDP messages about the change in state for the anchor. As with the original manager it has not yet created a local chat window for this chat ID (although the chat does exist in the database) so it proceeds to create the window, create an IRC view for the chats corresponding channel and joins it. IRC signals the join to all members in the channel (Elizabeth and the remote database) and the two users can now converse.

Tables A1–A4 illustrate program design language for some anchor operations that may implemented as a macro or other program (Subroutines (Subs and Functions) in Microsoft Word Visual Basic for Applications, for example) initiated by a corresponding mechanism (ActiveX control as described above, for example).

TABLE A1

Adding an Anchor

Subroutine addAnchorAt(doc As Document, aid As String, cid As String, context As String) As Boolean
    Declare myRange As a Microsoft Word Content Object (i.e., Range)
    'Find the area in the document to insert the anchor
    'by looking for matching text (what we call the context)
    Set myRange = findContext(doc, context)
    If myRange Is a valid document location Then
        Call doc.addNewSticky(anchorID, chatID)
    End If
End

TABLE A2

Adding a Conversation CLient (also referred to as a StickyChat)

'To the MS Word document' class we have added the following subroutine
Subroutine addNewSticky(anchorID As String, chatID As String )
    Declare thesticky as a Sticky Chat Object
    Declare theresults As A Microsoft Word InlineShape Object
    'Create A new MS Word InlineShapes
    'With an OLEControl of type "StickyChat.Sticky"
    Set result = InlineShapes.AddOLEControl(37 StickyChat.Sticky")
    Set thesticky = result.OLEFormat.Object
    thesticky.id = anchorID
    thesticky.ChatID = chatID
    'Generate a Context_Changed event to let the system know there
    'is a new anchor here
End

TABLE A3

Deleting an Anchor

Subroutine deleteAnchor(doc As Document, anchorid As String) As Boolean
    Declare anc As A Microsoft Word InlineShape Object
    'Look up the anchor by its ID
    Set anc = findAnchor(anchorid, doc)
    If anc is actually a valid Anchor Then
        'remove the anchor from it's Microsoft Word wrapper object
        ActiveDocument.unwrapByID (anchorid)
        ' DIE ANCHOR DIE!
        anc.Delete
    End If
End

TABLE A4

Moving an Anchor

Subroutine moveAnchor
    'Copy the anchor data as temporary data
    'Delete the anchor from its old location
    'Create a new anchor at the new location
    'Reset the anchor data to the old values in temporary data End
End Each of the above PDL's (Tables A1–A4), when finally coded, are linked, as described above, such that when a user clicks on an anchor in Microsoft Word, an event is passed to running Java components of the Anchored Conversation implementation. Communication is by UDP and TCP communication. A Java Chat Window is created, and the anchor communicates with the conversation coordinator identifying where it is, allowing the conversation coordinator to position the Chat Window in close proximity to the anchor.

The present invention, including the above example implementation, and each of the other teachings described further above, may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMS, EPROMS, EEPROMS, DRAMs, VRAMS, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, inserting anchors into work artifacts, communication with application programming interfaces of various applications, initiating communications and communication clients, maintaining relative positions of conversation or communication clients to corresponding anchors in a work artifact, retrieving and logging conversations, requesting and handling communications requests, managing connections, initiating applications and downloading artifacts, and the display, storage, or communication of results according to the processes of the present invention.

In one embodiment, the present invention is implemented in the Java language and has a class hierarchy as shown in Table B.

TABLE B

Class Hierarchy
    class java.lang.Object
        class StickyChat.Anchor
            class StickyChat.manager.AnchorWrapper
        class StickyChat.AnchorTable
        class StickyChat.Chat
        class StickyChat.relay.ChatEngine (implements java.lang.Runnable, StickyChat.relay.IChatEngine)
            class StickyChat.relay.ChatOptions (implements java.io.Serializable)
        class StickyChat.ChatTable
        class StickyChat.relay.ChatViewManager (implements StickyChat.relay.IChatViewManager)
        class StickyChat.util.Codecs
        class StickyChat.Dbg
        class java.util.Dictionary
            class java.util.Hashtable (implements java.lang.Cloneable, java.io.Serializable)
                class StickyChat.manager.GotoList
                class StickyChat.manager.LocalChatTable
            class java.util.Properties
                class StickyChat.util.Options
                class TABLE B-continued

```
StickyChat.server.ServerOptions
                class StickyChat.UserTable
                        class StickyChat.manager.WordDocIDList
                class StickyChat.Document
                class StickyChat.DocumentTable
                class StickyChat.net.HttpRequestHandler (implements
java.lang.Runnable)
                        class StickyChat.net.HttpBasicHandler
                                class StickyChat.manager.HttpManager
                                Handler
                                class StickyChat.server.HttpServerHandler
                        class StickyChat.manager.HttpFileHandler
                interface StickyChat.relay.IChatApp
                interface StickyChat.relay.IChatEngine
                interface StickyChat.relay.IChatView
                interface StickyChat.relay.IChatViewManager
                class StickyChat.manager.IRCApp (implements
StickyChat.relay.IChatApp)
        class StickyChat.server.IRCApp (implements
StickyChat.relay.IChatApp)
        class StickyChat.manager.IRCView (implements
StickyChat.relay.IChatView)
        class StickyChat.server.IRCView (implements
StickyChat.relay.IChatView)
        class StickyChat.relay.IdentServer (implements
java.lang.Runnable)
        interface StickyChat.manager.InviteAcceptReceiver
        interface StickyChat.manager.InviteEventReceiver
        class StickyChat.manager.LocalChat
        class StickyChat.relay.MainStub
        interface StickyChat.net.ManagerInterface
        class StickyChat.Member
        class StickyChat.MemberTable
        class StickyChat.util.Misc
        interface StickyChat.manager.ProgressReceiver
        class StickyChat.relay.RCTest
        class StickyChat.net.RequestDispatcher
                class StickyChat.manager.HttpRequestDispatcher
                class StickyChat.server.HttpRequestDispatcher
        class StickyChat.net.ServerCmd
                class StickyChat.net.EasyServerCmd
        class StickyChat.relay.ServerInfo (implements
java.io.Serializable)
        class StickyChat.util.ShellExec
        class StickyChat.net.SocketServer (implements
java.lang.Runnable)
        class StickyChat.Start
        class StickyChat.Tables
        class java.lang.Thread (implements java.lang.Runnable)
                class StickyChat.net.udpSocket
        class java.lang.Throwable (implements
java.io.Serializable)
                class java.lang.Error
                        class StickyChat.manager.RemoteError
                                class StickyChat.manager.RemoteAppError
                                class StickyChat.manager.RemoteNetError
                        class java.lang.Exception
                                class StickyChat.util.ShellException
        interface StickyChat.net.UdpEventReceiver
        class StickyChat.User
        class java.util.Vector (implements
java.lang.Cloneable, java.io.Serializable)
                class StickyChat.AnchorIDList
        class StickyChat.manager.WFCinviteEventReceiver
(implements StickyChat.manager.InviteEventReceiver)
        class StickyChat.manager.WFCudpEventReceiver
(implements StickyChat.net.UdpEventReceiver)
        class StickyChat.manager.Word
        class StickyChat.manager.WordCmd
        class StickyChat.manager.WordDoc
```

Obviously, numerous modifications and variations of the present invention are possible in light of the above teachings. It is therefore to be understood that within the scope of the appended claims, the invention may be practiced otherwise than as specifically described herein.

The invention claimed is:

1. A system for placing and maintaining anchored conversations within an artifact comprising a file having a file type, the system comprising:
   an application configured to access the artifact, wherein the application is associated with the file type;
   a conversation client configured to access said anchored conversation and to receive communications regarding a portion of the artifact, while the artifact is viewed within the application;
   an anchor configured to identify a location within said artifact with which said conversation client is associated;
   a conversation coordinator configured to maintain a relationship between the anchor, the conversation client and the anchored conversation;
   at least one conversation database accessible by the conversation coordinator, said conversation database including a conversation history and access control data, wherein said conversation history comprises:
   conversation elements and meta data, including command invocations, anchor positions, anchor context, conversation state changes, and shared artifact version data; and
   wherein said access control data comprises access control lists, user accounts, and user privileges.

2. The system according to claim 1, wherein said conversation coordinator and said conversation client are separate applications linked together by communications such that said conversation coordinator directs initiation and positioning of said conversation client.

3. The system according to claim 1, wherein the application is configured to allow access to sections of the artifact outside the anchor.

4. The system according to claim 1, wherein:
   said conversation coordinator comprises,
   a request handler configured to receive conversation requests from a requesting conversation client, and
   a client mechanism configured to initiate a recipient conversation client having an anchor position, application, and artifact equivalent to the application, artifact, and anchor position of the requesting conversation client.

5. The system according to claim 4, wherein said request handler includes an approval mechanism that identifies whether an intended recipient of the conversation request approves entering into an anchored conversation.

6. The system according to claim 5, wherein said approval mechanism includes an id device that identifies all participants of a conversation to the intended recipient.

7. The system according to claim 4, wherein:
   said client mechanism comprises,
   a startup mechanism configured to initiate a target application associated with a conversation request received by the request handler;
   a retrieval mechanism configured to retrieve an artifact associated with the conversation request and load the retrieval artifact into the target application;
   a connection manager configured to establish a communications link with the requesting conversation client and the recipient conversation client; and
   an anchor device configured to locate and attach the recipient conversation client to the equivalent anchor position in the retrieved artifact.

8. The system according to claim 7, wherein said anchor device is further configured to track a location of said equivalent anchor position, and position a user interface of the conversation client to within a predetermined proximity of the anchor if a position of the anchor is moved.

9. The system according to claim 7, wherein said anchor device comprises:
an attachment device configured to maintain a position of the conversation client relative to the corresponding anchor;
an unattach device configured to disassociate the position of the conversation client from a corresponding anchor; and
a reattachment device configured to re-attach a detached conversation client to the position of its corresponding anchor.

10. The system according to claim 4, wherein said conversation coordinator further comprises a synchronization device configured to notify a user of the recipient conversation client if the artifact associated with the recipient conversation client becomes out of sync with a master document.

11. The system according to claim 10, wherein said synchronization device includes an activatable input mechanism by which a user may activate a synchronization process to update the out of synch artifact.

12. The system according to claim 10, wherein said conversation coordinator further comprises an update mechanism configured to update the artifact based on changes to the master document.

13. The system according to claim 10, wherein said master document is the artifact of the requesting conversation client.

14. The system according to claim 4, wherein said conversation coordinator further comprises an anchor identification mechanism configured to identify other anchored conversations in the artifact of the recipient conversation client and one of highlight, grey, and make invisible each identified anchor based on a predetermined access/privacy setting.

15. The system according to claim 1, further comprising:
an API mechanism configured to initiate at least one target application and load an artifact into the target application; and
an anchor device configured to anchor a conversation client to one of the artifact and an anchor of the artifact.

16. The system according to claim 15, wherein said API mechanism includes at least one application control device configured to direct operations of at least one target application via a target application programming interface.

17. The system according to claim 1, wherein said conversation coordinator comprises:
a client mechanism configured to initiate a conversation client; and
an anchor device configured to position the conversation client relative to one of said application and an anchor of said artifact.

18. The system according to claim 1, wherein said conversation coordinator further comprises a messaging device configured to receive messages from said application.

19. The system according to claim 18, wherein said messages include at least one of an anchor position, invocation of an anchored conversation, and adding an anchor.

20. The system according to claim 1, wherein said conversation coordinator includes a communications device configured to route communications, from the conversation client to a communications network, and from the communications network to the conversation client.

21. The system according to claim 20, wherein said communications device is an IRC client configured to pass and retrieve communication to an IRC network.

22. The system according to claim 1, wherein:
said conversation coordinator includes a database mechanism configured to connect a remote database as a silent participant to the conversation client.

23. A system for invoking anchored conversations having artifacts of applications as a context, comprising:
an application conversation interface (ACI) having an application access mechanism that allows access and manipulation of application operations of each of the said applications;
an anchor mechanism configured to identify and attach a conversation client to a selected anchor position in an artifact; and
a communications device configured to route communications, from the conversation client to a communications network, and from the communications network to the conversation client,
wherein said communications device is an IRC client configured to pass and retrieve communication to an IRC network; and
at least one conversation database accessible by the conversation coordinator, said conversation database including a conversation history and access control data, wherein said conversation history comprises:
conversation elements and metadata, including command invocations, anchor positions, anchor context, conversation state changes, and shared artifact version data; and
wherein said access control data comprises access control lists, user accounts, and user privileges.

24. The system according to claim 23, wherein said conversation client comprises a communication client capable of any one of text, sound, graphic, tactile, video, and other communication mediums.

25. The system according to claim 23, further comprising:
a conversation coordinator configured to,
receive initiation requests from an application,
initiate a conversation client to be anchored at an anchor position associated with the initiation request, and
send anchored conversation request for initiating an anchored conversation client at a recipient host having a same application, artifact, and anchor position as the requesting conversation client.

26. A system for anchored conversations, comprising:
means for initiating and maintaining conversation clients at each of a requesting host and a recipient host, including,
means for receiving an anchored conversation request from an application at a requestor host, said application having an artifact with anchor identifying a location of an anchored conversation;
means for initiating a requestor conversation client associated with the application at a requester host;
means for anchoring said requester conversation client comprising a means for maintaining a position of said requestor conversation client relative to said anchor of said artifact of said application at said requestor host;
means for requesting startup of a recipient conversation client;
storage means for at least one of conversation history data and access control data;
means for starting said application at a recipient host;
means for retrieving a copy of said artifact into said application at said recipient host; and means for anchoring said recipient conversation client, comprising a means for maintaining a position of said recipient conversation client relative to said anchor of said artifact of said application at said recipient host;
wherein said means for anchoring further comprise:
request means configured to receive conversation requests from a requesting conversation client; and
  a client mechanism means configured to initiate a recipient conversation client having an anchor position, application, and artifact equivalent to the application, artifact, and anchor position of the requesting conversation client; and
an anchor identification means configured to identify other anchored conversations in the artifact of the recipient conversation client and to one of highlight, grey, and make invisible each identified anchor based on a predetermined access/privacy setting.

27. A system for placing and maintaining anchored conversations within an artifact comprising a file having a file type, the system comprising:
  an application configured to access the artifact, wherein the application is associated with the file type;
  a conversation client configured to access said anchored conversation and to receive communications regarding a portion of the artifact, while the artifact is viewed within the application, wherein the communications are received from a party having access to the file;
  an anchor configured to identify a location within said artifact with which said conversation client is associated;
  a conversation coordinator configured to maintain a relationship between the anchor, the conversation client and the anchored conversation
  at least one conversation database accessible by the conversation coordinator, said conversation database including a conversation history and access control data,
  wherein said conversation history comprises:
    conversation elements and meta data, including command invocations, anchor positions, anchor context, conversation state changes, and shared artifact version data; and
  wherein said access control data comprises access control lists, user accounts, and user privileges.

* * * * *